(12) United States Patent
Dobyns

(10) Patent No.: US 10,117,050 B2
(45) Date of Patent: *Oct. 30, 2018

(54) TECHNIQUES FOR WIRELESS COMMUNICATION OF PROXIMITY BASED CONTENT

(71) Applicant: FREELINC TECHNOLOGIES INC., Orem, UT (US)

(72) Inventor: Douglas Howard Dobyns, Lindon, UT (US)

(73) Assignee: FREELINC TECHNOLOGIES INC., Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/381,879

(22) Filed: Dec. 16, 2016

(65) Prior Publication Data

US 2017/0238132 A1 Aug. 17, 2017

Related U.S. Application Data

(63) Continuation of application No. 15/072,179, filed on Mar. 16, 2016, which is a continuation of application
(Continued)

(51) Int. Cl.
*H04B 5/00* (2006.01)
*H04W 4/021* (2018.01)
(Continued)

(52) U.S. Cl.
CPC ........ *H04W 4/021* (2013.01); *G06Q 30/0224* (2013.01); *G06Q 30/0234* (2013.01);
(Continued)

(58) Field of Classification Search
CPC ......... H04B 5/00; H04W 4/008; H04W 4/028
(Continued)

(56) References Cited

U.S. PATENT DOCUMENTS 3,660,760 A 5/1972 Schaad et al.
4,363,137 A 12/1982 Salisbury
(Continued)

FOREIGN PATENT DOCUMENTS

GB 2444965 A 6/2008
WO WO 2007/039835 A2 4/2007
WO WO 2008048376 A1 4/2008

OTHER PUBLICATIONS

US 8,200,153, 06/2012, Takayama et al. (withdrawn)
(Continued)

*Primary Examiner* — Md Talukder
(74) *Attorney, Agent, or Firm* — Thorpe North & Western

(57) ABSTRACT

A system and method for communication of proximity based content is disclosed between a mobile computing device having a Short Range Communication (SRC) device and a Proximity Short Range Communication (PSRC) device associated with a location or object using near field magnetic induction. The SRC device and/or the PSRC device can include at least two antennas to provide magnetic induction diversity. The method comprises defining a proximity boundary with dimensions defined by a magnetic induction diversity communication range of at least one of the SRC and PSRC devices. A proximity signal is communicated in the proximity boundary between the SRC device and the PSRC device. At least one action is performed by the mobile computing device or the PSRC device when the proximity signal is detected between the SRC device and the PSRC device.

30 Claims, 4 Drawing Sheets

Related U.S. Application Data

No. 13/291,925, filed on Nov. 8, 2011, now Pat. No. 9,400,985.

(60) Provisional application No. 61/411,316, filed on Nov. 8, 2010.

(51) Int. Cl.
| | | |
|---|---|---|
| *G06Q 30/02* | | (2012.01) |
| *H04B 7/0404* | | (2017.01) |
| *H04W 12/02* | | (2009.01) |
| *H04W 4/02* | | (2018.01) |

(52) U.S. Cl.
CPC ..... *G06Q 30/0236* (2013.01); *G06Q 30/0255* (2013.01); *G06Q 30/0261* (2013.01); *G06Q 30/0267* (2013.01); *G06Q 30/0268* (2013.01); *H04B 5/0031* (2013.01); *H04B 5/0075* (2013.01); *H04B 7/0404* (2013.01); *H04W 4/023* (2013.01); *H04W 12/02* (2013.01)

(58) Field of Classification Search
USPC ...... 455/41.1, 41.2, 41.3, 456.3, 426.1, 292, 455/418
See application file for complete search history.

(56) References Cited

U.S. PATENT DOCUMENTS

| | | | |
|---|---|---|---|
| 4,908,869 A | 3/1990 | Lederman | |
| 5,187,720 A | 2/1993 | Shibata et al. | |
| 5,771,438 A | 6/1998 | Palermo et al. | |
| 5,841,122 A | 11/1998 | Kirchhoff | |
| 5,912,925 A | 6/1999 | Palermo et al. | |
| 5,966,641 A | 10/1999 | Flowerdew | |
| 5,982,764 A | 11/1999 | Palermo et al. | |
| 6,061,030 A | 5/2000 | Flowerdew | |
| 6,134,420 A | 10/2000 | Flowerdew et al. | |
| 6,208,740 B1 | 3/2001 | Greyer | |
| 6,230,029 B1 | 5/2001 | Hahn et al. | |
| 6,384,587 B2 | 5/2002 | Aizawa et al. | |
| 6,459,822 B1 | 10/2002 | Palermo et al. | |
| 6,636,728 B1 | 10/2003 | Avenel | |
| 6,665,804 B1 | 12/2003 | Minowa | |
| 6,700,544 B2 | 3/2004 | Anderson | |
| 6,792,246 B2 | 9/2004 | Takeda et al. | |
| 6,819,762 B2 | 11/2004 | Jones et al. | |
| 6,840,448 B2 | 1/2005 | Fukushima et al. | |
| 6,869,019 B1 | 3/2005 | Nagi et al. | |
| 7,035,608 B2 | 4/2006 | Palermo et al. | |
| 7,096,069 B2 | 8/2006 | Wanderstok et al. | |
| 7,142,811 B2 | 11/2006 | Terranova et al. | |
| 7,149,522 B2 | 12/2006 | Koshelainen | |
| 7,182,266 B2 | 2/2007 | Yoshingaga et al. | |
| 7,198,198 B2 | 4/2007 | Akiho et al. | |
| 7,215,924 B2 | 5/2007 | Palermo et al. | |
| 7,236,741 B2 | 6/2007 | Palermo et al. | |
| 7,254,366 B2 | 8/2007 | Palermo et al. | |
| 7,262,737 B2 | 8/2007 | Zamowitz et al. | |
| RE39,982 E | 1/2008 | Palermo et al. | |
| RE40,018 E | 1/2008 | Palermo et al. | |
| 7,315,290 B2 | 1/2008 | Harada et al. | |
| 7,342,548 B2 | 3/2008 | Taniguchi et al. | |
| 7,346,061 B2 | 3/2008 | Takayama et al. | |
| 7,364,144 B2 | 4/2008 | Nordmeyer | |
| 7,438,235 B2 | 10/2008 | Miura et al. | |
| 7,457,637 B2 | 11/2008 | Deguchi et al. | |
| 7,532,901 B1 | 5/2009 | LaFranchise et al. | |
| 7,541,930 B2 | 6/2009 | Saarisalo et al. | |
| 7,565,187 B1 | 7/2009 | Dynok et al. | |
| 7,574,173 B2 | 8/2009 | Terranova et al. | |
| 7,627,289 B2 | 12/2009 | Huddart | |
| 7,647,024 B2 | 1/2010 | Wang et al. | |
| 7,712,663 B2 | 5/2010 | Sukegawa et al. | |
| 7,818,036 B2 | 10/2010 | Lair et al. | |
| 7,818,037 B2 | 10/2010 | Lair et al. | |
| 7,831,205 B2 | 11/2010 | Jack et al. | |
| 7,872,995 B2 | 1/2011 | Fujii et al. | |
| 7,893,888 B2 | 2/2011 | Rofougaran | |
| 7,903,041 B2 | 3/2011 | LeVan | |
| 7,933,554 B2 | 4/2011 | Hoyt et al. | |
| 7,941,096 B2 | 5/2011 | Perkins et al. | |
| 8,106,848 B2 | 1/2012 | Rofougaran | |
| 8,145,744 B2 | 3/2012 | Gieslis | |
| 8,190,086 B2 | 5/2012 | Sasaki et al. | |
| 8,194,557 B2 | 6/2012 | Sasai et al. | |
| 8,224,243 B2 | 7/2012 | Takayama et al. | |
| 8,233,841 B2 | 7/2012 | Griffin et al. | |
| 8,237,569 B2 | 8/2012 | Arai et al. | |
| 8,239,276 B2 | 8/2012 | Lin et al. | |
| 8,275,318 B2 | 9/2012 | Hoyt et al. | |
| 8,322,615 B2 | 12/2012 | Ikeda | |
| 8,335,470 B2 | 12/2012 | Koyama | |
| 8,340,577 B2 | 12/2012 | Griffin et al. | |
| 8,358,596 B2 | 1/2013 | Byme et al. | |
| 8,380,124 B2 | 2/2013 | Takei et al. | |
| 8,385,823 B2 | 2/2013 | Naniyat | |
| 8,401,596 B2 | 3/2013 | Takayama | |
| 8,410,775 B2 | 4/2013 | LaFranchise et al. | |
| 8,416,078 B2 | 4/2013 | Sayegh et al. | |
| 8,417,184 B2 | 4/2013 | Takayama et al. | |
| 8,422,947 B2 | 4/2013 | Konya | |
| 8,427,100 B2 | 4/2013 | Vorenkamp et al. | |
| 8,427,330 B2 | 4/2013 | Vorenkamp et al. | |
| 8,452,233 B2 | 5/2013 | Noel | |
| 8,457,547 B2 | 6/2013 | Meskens | |
| 8,457,550 B2 | 6/2013 | Goto et al. | |
| 8,466,740 B2 | 6/2013 | Kamata | |
| 8,494,198 B2 | 7/2013 | Aldaz et al. | |
| 8,523,570 B2 | 9/2013 | Fukami et al. | |
| 8,532,568 B2 | 9/2013 | Kerselaers | |
| 8,536,736 B2 | 9/2013 | Abramo et al. | |
| 8,583,040 B2 | 11/2013 | Baumert et al. | |
| 8,588,683 B2 | 11/2013 | Kamata | |
| 8,630,584 B2 | 1/2014 | Yu et al. | |
| 8,643,219 B2 | 2/2014 | Yabe et al. | |
| 8,665,840 B2 | 3/2014 | Hohl et al. | |
| 8,706,029 B2 | 4/2014 | Washiro | |
| 8,811,897 B2 | 8/2014 | Matsumoto et al. | |
| 8,838,022 B2 | 9/2014 | Dobyns | |
| 8,880,100 B2 | 11/2014 | Dobyns | |
| 8,902,772 B2 | 12/2014 | Lenaerts | |
| 8,903,416 B1 | 12/2014 | Perkins et al. | |
| 8,909,141 B2 | 12/2014 | Hansen et al. | |
| 8,929,809 B2 | 1/2015 | Dobyns | |
| 8,942,629 B2 | 1/2015 | Takayama et al. | |
| 8,954,005 B2 | 2/2015 | Zhao et al. | |
| 8,977,200 B2 | 3/2015 | Kitagawa et al. | |
| 8,983,529 B2 | 3/2015 | Akiyama et al. | |
| 8,983,615 B2 | 3/2015 | Tahmasian et al. | |
| 8,989,657 B2 | 3/2015 | McManus et al. | |
| 8,989,659 B2 | 3/2015 | Akita et al. | |
| 9,013,303 B2 | 4/2015 | Arai et al. | |
| 9,048,884 B2 | 6/2015 | LeVan | |
| 9,054,746 B2 | 6/2015 | Miyabayashi et al. | |
| 9,058,531 B2 | 6/2015 | Slutsky | |
| 9,071,288 B2 | 6/2015 | Yamaguchi | |
| 9,077,390 B1 | 7/2015 | Joehren | |
| 9,082,117 B2 | 7/2015 | Chin | |
| 9,106,273 B2 | 8/2015 | Takayama et al. | |
| 9,124,306 B2 | 9/2015 | Boyle et al. | |
| 9,124,992 B2 | 9/2015 | Jang | |
| 9,166,286 B2 | 10/2015 | Matsuoka et al. | |
| 9,166,655 B2 | 10/2015 | Meskens et al. | |
| 9,197,986 B1 | 11/2015 | Kerselaers et al. | |
| 9,219,529 B2 | 12/2015 | Akiyama et al. | |
| 9,229,666 B2 | 1/2016 | Oguma et al. | |
| 9,400,985 B2 | 7/2016 | Dobyns | |
| 9,455,771 B2 | 9/2016 | Dobyns | |
| 9,722,674 B2 | 8/2017 | Dobyns | |
| 2001/0006536 A1 | 7/2001 | Tajima | |
| 2002/0132585 A1 | 9/2002 | Palermo et al. | |
| 2002/0160722 A1 | 10/2002 | Terranova et al. | |
| 2002/0174025 A1 | 11/2002 | Hind et al. | |

(56) References Cited

U.S. PATENT DOCUMENTS

| | | |
|---|---|---|
| 2003/0050011 A1 | 3/2003 | Palermo et al. |
| 2003/0161410 A1 | 8/2003 | Smith et al. |
| 2004/0178267 A1* | 9/2004 | Tsirline ............... G06K 7/0008 235/449 |
| 2005/0064915 A1 | 3/2005 | Lair |
| 2005/0138077 A1 | 6/2005 | Michael et al. |
| 2005/0164636 A1 | 7/2005 | Palermo et al. |
| 2006/0073825 A1* | 4/2006 | Palermo ................... H04B 5/02 455/426.1 |
| 2006/0100926 A1 | 5/2006 | Abedi et al. |
| 2006/0119534 A1 | 6/2006 | Semba et al. |
| 2006/0206376 A1 | 9/2006 | Gibbs et al. |
| 2006/0224048 A1 | 10/2006 | Devaul et al. |
| 2007/0054616 A1 | 3/2007 | Culbert |
| 2007/0278290 A1 | 12/2007 | Messerges et al. |
| 2008/0090520 A1 | 4/2008 | Camp et al. |
| 2008/0091541 A1 | 4/2008 | Law et al. |
| 2008/0258863 A1* | 10/2008 | Vrielink ................... G01S 5/02 340/5.2 |
| 2008/0278289 A1 | 11/2008 | Gantner |
| 2009/0001930 A1 | 1/2009 | Pohjonen |
| 2009/0027166 A1* | 1/2009 | Stevens ............ G06K 19/07749 340/10.1 |
| 2009/0029743 A9 | 1/2009 | Lair et al. |
| 2009/0296770 A1 | 1/2009 | Stevens et al. |
| 2009/0041241 A1 | 2/2009 | Dobyns et al. |
| 2009/0081943 A1 | 3/2009 | Dobyns et al. |
| 2009/0146796 A1 | 6/2009 | Goto et al. |
| 2009/0167699 A1 | 7/2009 | Rosenblatt et al. |
| 2009/0189816 A1 | 7/2009 | Nikitin et al. |
| 2009/0212941 A1 | 8/2009 | Vock et al. |
| 2009/0276439 A1 | 11/2009 | Rosesnblatt et al. |
| 2009/0276547 A1 | 11/2009 | Rosenblatt et al. |
| 2010/0026589 A1 | 2/2010 | Dou et al. |
| 2010/0079261 A1 | 4/2010 | Goto et al. |
| 2010/0080165 A1 | 4/2010 | Hossain et al. |
| 2010/0104031 A1 | 4/2010 | Lacour |
| 2011/0018768 A1 | 1/2011 | Thoen |
| 2011/0029370 A1 | 2/2011 | Roeding et al. |
| 2011/0183617 A1 | 7/2011 | Behzad et al. |
| 2011/0201270 A1 | 8/2011 | Perkins et al. |
| 2011/0220527 A1 | 9/2011 | Baatz |
| 2011/0307380 A1 | 12/2011 | Ido |
| 2012/0083228 A1 | 4/2012 | Baumert et al. |
| 2012/0116861 A1 | 5/2012 | Dobyns |
| 2012/0173351 A1 | 7/2012 | Hanson et al. |
| 2012/0203620 A1* | 8/2012 | Dobyns ............. G06Q 30/0234 705/14.38 |
| 2012/0220227 A1 | 8/2012 | Dobyns |
| 2012/0281843 A1 | 11/2012 | Christensen et al. |
| 2012/0289153 A1* | 11/2012 | Dobyns ............. G06Q 30/0234 455/41.1 |
| 2012/0296770 A1 | 11/2012 | Lin et al. |
| 2013/0020394 A1 | 1/2013 | Koujima et al. |
| 2013/0072115 A1 | 3/2013 | Dobyns |
| 2013/0079037 A1* | 3/2013 | Dobyns ................. H04W 4/023 455/456.3 |
| 2013/0114306 A1 | 5/2013 | Kooken et al. |
| 2013/0217334 A1 | 8/2013 | Yu et al. |
| 2013/0269945 A1 | 10/2013 | Mulholland et al. |
| 2013/0342326 A1 | 12/2013 | Wang et al. |
| 2014/0015649 A1 | 1/2014 | Akiyama et al. |
| 2014/0073237 A1 | 3/2014 | Meskens |
| 2014/0077937 A1 | 3/2014 | Kato et al. |
| 2014/0091758 A1 | 4/2014 | Hidaka et al. |
| 2014/0153768 A1 | 6/2014 | Hagen et al. |
| 2014/0162550 A1 | 6/2014 | Boyle et al. |
| 2014/0191968 A1 | 7/2014 | Hohl et al. |
| 2014/0213184 A1 | 7/2014 | Matsubara |
| 2014/0227974 A1 | 8/2014 | Perkins et al. |
| 2014/0263619 A1 | 9/2014 | Turocy et al. |
| 2014/0308896 A1 | 10/2014 | Baret et al. |
| 2014/0315485 A1 | 10/2014 | Marie |
| 2014/0348365 A1 | 11/2014 | Edwards |
| 2014/0376051 A1 | 12/2014 | Oguma et al. |
| 2015/0044968 A1 | 2/2015 | Dobyns |
| 2015/0045069 A1 | 2/2015 | Dobyns |
| 2015/0050883 A1 | 2/2015 | Dobyns |
| 2015/0054455 A1 | 2/2015 | Kim et al. |
| 2015/0079902 A1 | 3/2015 | Dhayni |
| 2015/0116090 A1 | 4/2015 | Proehl |
| 2015/0140927 A1 | 5/2015 | Chen et al. |
| 2015/0180270 A1 | 6/2015 | Takano |
| 2015/0229361 A1 | 8/2015 | Liu et al. |
| 2015/0244422 A1 | 8/2015 | Ohashi et al. |
| 2015/0254481 A1 | 9/2015 | Masuda et al. |
| 2015/0256230 A1 | 9/2015 | Yamaguchi |
| 2015/0256231 A1 | 9/2015 | Akiyama et al. |
| 2015/0318896 A1 | 11/2015 | Kerselaers et al. |
| 2015/0318932 A1 | 11/2015 | Kerselaers et al. |
| 2015/0319566 A1 | 11/2015 | Takayama et al. |
| 2015/0327003 A1 | 11/2015 | Dobyns |
| 2015/0365779 A1* | 12/2015 | Kerselaers ........... H01Q 9/0442 455/41.2 |
| 2015/0382150 A1 | 12/2015 | Ansermet et al. |
| 2016/0014582 A1 | 1/2016 | Dobyns |
| 2016/0029955 A1 | 2/2016 | Sato |
| 2016/0066143 A1* | 3/2016 | Dobyns .................. G06Q 20/40 455/41.1 |

OTHER PUBLICATIONS

Admin; Radio Frequency Identification—RFID; RFID—Handbook; [online]; [retrieved Oct. 4, 2016]; 4 pages; Retrieved from <URL: http://rfid-handbook.com >.

Agbinya et al.; "Size and Characteristics of the 'Cone of Silence' in Near Field Magnetic Induction Communications"; In: Military Communications and Information Systems (MilCIS), 2009 Annual Conference; pp. 1-4; National Convention Centre, Canberra.

ECMA International; "Near Field Communication and Protocol (NFCIP-1)"; Standard ECMA —340; (Dec. 2004); 65 pages; $2^{nd}$ Edition.

Finkenzeller; "Chapter 3. Fundamental Operating Principles"; RFID Handbook: Fundamentals and Applications in Contactless Smart Cards, Radio Frequency Identification and Near-Field Communication; (Aug. 2010); pp. 29-59; $3^{rd}$ Edition.

ISO/IEC JTC1/SC17/SG8; "Identification Cards—Contactless Integrated Circuit(s) Cards—Proximity Cards—Part 1: Physical Characteristics"; ISO/IEC FCD 14443-1; (Feb. 14, 2007); 8 pages; N 1315.

NFC Forum; "Home"; [online]; [retrived on Sep. 17, 2010]; 5 pages; Retrieved from <URL:http://www.nfc-forum.org/home/ >.

Sandrock et al.; "Wireless Transmission of Speech and Data to, from, and Between Hearing Aids"; The Hearing Journal; (Nov. 2007); pp. 12-16; vol. 60, No. 11.

* cited by examiner

TECHNIQUES FOR WIRELESS COMMUNICATION OF PROXIMITY BASED CONTENT

CROSS-REFERENCE TO RELATED APPLICATION

This application is a continuation of U.S. patent application Ser. No. 15/072,179 filed on Mar. 16, 2016 which is a continuation of U.S. patent application Ser. No. 13/291,925 filed on Nov. 8, 2011, which claims the benefit under 35 U.S.C. § 119(e) of U.S. Provisional Application No. 61/411,316 filed on Nov. 8, 2010 all of which are hereby incorporated by reference.

BACKGROUND

Wireless communication has revolutionized society in the 21$^{st}$ century. The way in which people talk, correspond, work, shop, and are entertained has all been changed due to the near omnipresent ability to wirelessly communicate. However, wireless communication is typically not confined to a defined area. Even low power, short range wireless communication standards can be detected over a radius of tens or hundreds of meters. The lack of ability to confine wireless communications to a defined area has limited its use in certain applications and reduced the overall security of wireless communications.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
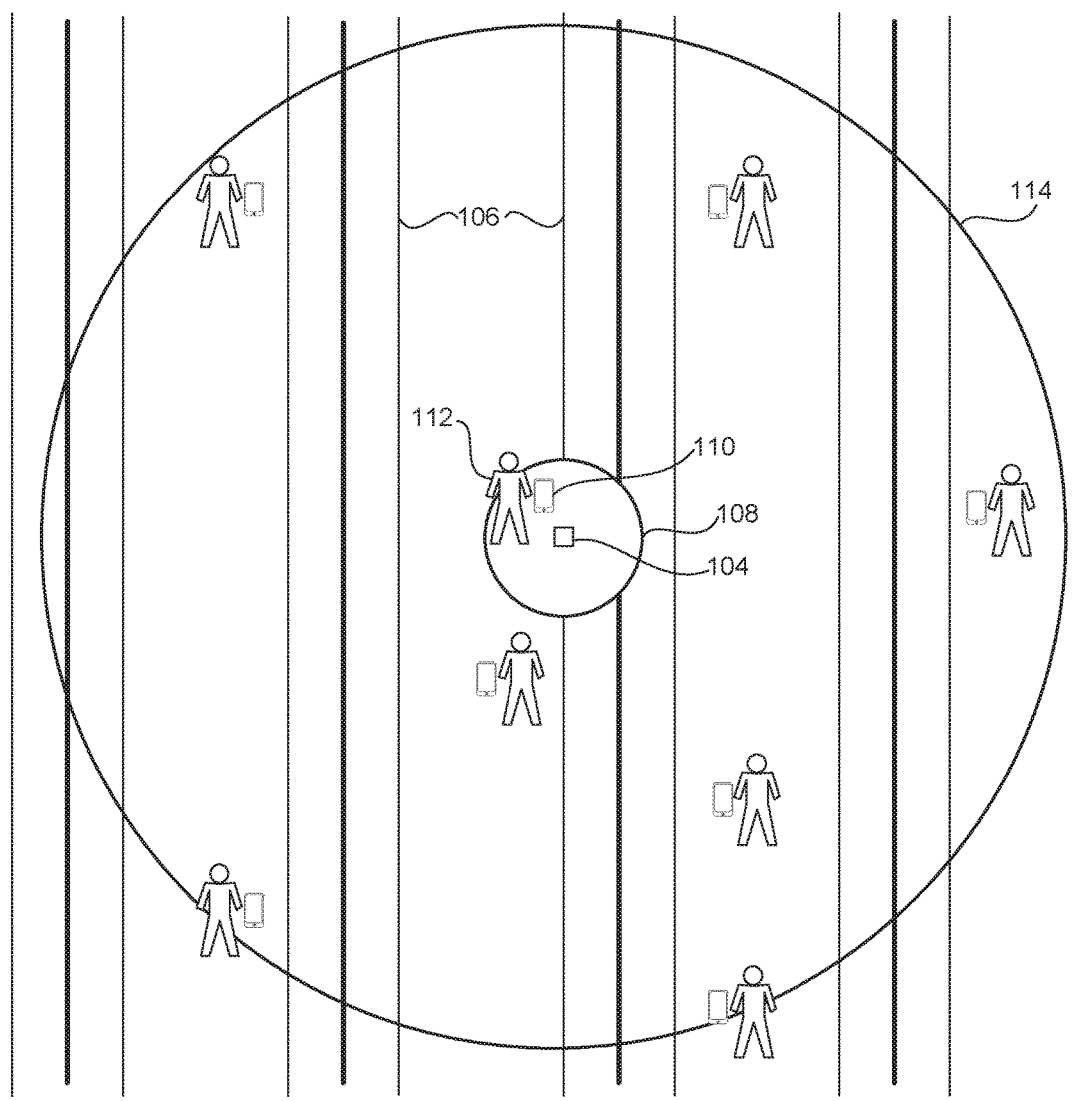
FIG. 1 is an example illustration of a proximity based marketing system in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. The following definitions are provided for clarity of the overview and embodiments described below.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "about" is used to provide flexibility to a numerical range endpoint by providing that a given value may be "a little above" or "a little below" the endpoint.

As used herein, the term "advertisement communication" includes the delivery of marketing information for a selected product or group of products, solicitations for the product or group of products, and coupons, rebates, or other types of promotional offerings for the product or group of products.

As used herein, the term "user" and "consumer" are considered to be synonymous unless explicitly described otherwise.

As used herein, the term "product" is intended to refer to a good or service that is advertised and/or offered for sale.

As used herein, the term "NFC compliant device" refers to a wireless communication device that can be compliant with at least one of the ISO specifications including ISO 14443A, ISO 14443B, ISO 18092, and ISO 15693. At the time of writing, the most current ISO 14443 specification for parts A and B consists of four parts: (1) the ISO/IEC 14443-1:2008 disclosing physical characteristics specifications; (2) the ISO/IEC 14443-2:2001 disclosing radio frequency and signal interference specifications; (3) the ISO/IEC 14443-3:2001 disclosing initialization and anti-collision specifications; and (4) the ISO/IEC 14443-4:2001 disclosing transmission protocol specifications. The ISO 15693 specification consists of three parts: (1) ISO/IEC 15693-1:2000 disclosing physical characteristics specifications; (2) ISO/IEC 15693-2:2006 disclosing air interface and initialization specifications; and (3) ISO/IEC 15693-3:2009 disclosing anti-collision and transmission protocol specifications. An NFC compliant device is considered to be compliant if the device is substantially compliant, or expected to be substantially compliant with an accepted version of the ISO 14443, ISO 18092, or ISO 15693 specifications, whether the accepted date is previous to the versions listed above or consists of a future accepted version of the specifications, or has evolved from similar technology over time. The term NFC compliant device can also refer to other types of close proximity communication devices that are not compliant with the ISO 14443 specifications but are configured to communicate at a distance of about 10 cm or less.

As used herein, the term "close proximity communication device" is intended to refer to NFC compliant devices, as well as other types of devices that are configured to communicate only within a close proximity of less than about 30 centimeters (cm) from a receiver or transceiver.

As used herein, discussion of a communication from one device to another device may be provided as an example communication between devices but is not intended to be limited to a unidirectional communication. For example, embodiments where a first device sends a communication to a second device are not-limited to a one-directional communication from the first to the second device, but can also include embodiments where the communication is sent from the second device to the first device, or where communications are bi-directionally exchanged from the first device to the second device and from the second device to the first device.

As used herein, the term "mobile computing device" refers to a device including a digital processor coupled to a digital memory. The mobile computing device may be a simple device operable to receive a signal and respond. Alternatively, the mobile computing device can be a complex device having multiple processors and a display screen.

As used herein, the term "cloud based storage" refers to digital storage at a remote location. The digital storage can be any type of digital storage including, but not limited to, magnetic storage, optical storage, and solid state storage devices. The digital storage may be located on a server. A local device, such as a mobile computing device or a proximity computing device can access the digital storage at the remote location via a wireless or a wired connection through a private or public network including, but not limited to a local area network, a personal area network, a wide area network, and an internet connection.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The wireless communication of proximity based content enables a user to send or receive content when the user is within a limited proximity of a location or object. The content may be related to or associated with the location or the object. Also, the sending or receiving of the content may be triggered by the user entering the limited proximity to the location or the object.

In one embodiment, the wireless communication of the proximity based content can be accomplished by wirelessly communicating with a user's mobile computing device, such as a smart phone. While the mobile computing device is described herein as being mobile, the mobile computing device may be a fixed device. The mobile computing device can be a handheld computing device, a portable multimedia device, a smart phone, a tablet computing device, a laptop computer, an embedded computing device or similar device. An embedded computing device is a computing device that is inlayed in a selected object such as a vehicle, a watch, a key fob, a ring, a key card, a token, a poker chip, a souvenir, a necklace amulet, and so forth. A computing device may be embedded in substantially any type of object. The mobile computing device can be a device that is user owned, rented, leased, associated with, or otherwise in the possession of the user. A user owned device can include mobile computing devices that are actually owned by relatives, friends, and employers of the user.

In one embodiment, the wireless communication of the proximity based content can be accomplished by the user's mobile computing device wirelessly communicating with a proximity computing device that is disposed at or near, or otherwise associated with, a location or object. While the proximity computing device may be described herein as being fixed, the proximity computing device may be a mobile device. The proximity computing device may be another mobile computing device or any other type of computing device. The proximity computing device may be owned by the user or another entity.

The proximity based content that is sent by one of the mobile computing device and the proximity computing device to the other of the mobile computing device and the proximity computing device, may include content that is locally stored, content that is received through a wired or wireless network from a remote content storage and/or providing device, or a combination thereof. The proximity based content may be generated by the user or another entity either locally or remotely, and in advance or contemporaneously with the sending of the proximity based content. The proximity based content that is received by one of the mobile computing device and the proximity computing device from the other of the mobile computing device and the proximity computing device may be at least one of locally stored, locally processed, and communicated to another entity via a wired or wireless network. One of the mobile computing device and the proximity computing device can receive or store a pointer that identifies where the proximity based content is located.

The mobile computing device can include a short range communication (SRC) device configured to communicate with another SRC device included with the proximity computing device that is associated with the location or the object. Herein, the SRC device included in the mobile computing device will be referred to as an SRC device and the SRC device included in the proximity computing device will be referred to as a PSRC device. Herein, the SRC device and the mobile computing device may be interchangeably referred to. Similarly, the PSRC device and the proximity computing device may be interchangeably referred to. However, in certain embodiments the PSRC device may be used without a proximity computing device and may have one or more of the functions of the proximity computing device included therein.

In one embodiment, when each PSRC device is associated with a selected location or object, the PSRC may be located at or adjacent to the location or object with which the PSRC device is associated, such as in a store, at a kiosk, at an event, at a point of entry, and so forth. When the user travels within the limited proximity of the PSRC device, content can be communicated between the PSRC device and the user's mobile computing device. The content may include instructions for the mobile computing device to send a notification that the user is in the proximity of the associated location or object. The content may also include more detailed content, such as one or more of identifying information, a message, multimedia content, information about the location or object, advertisement information, etc. The type of content communicated can depend on an identity of the user. For instance, different types of content may be communicated depending on one or more characteristics of the user, such as purchasing behavior, filter preference settings, personal profile settings, and/or the age and gender of the user, etc. In addition, the type of content communicated can depend on one or more of any other types of conditions, including the time, date, weather, etc.

The SRC device and the PSRC device can be configured to enable the user to efficiently communicate within a defined proximity, while substantially minimizing communication that can occur outside of the defined proximity. The defined proximity can be a selected diameter around the location or object, such as a diameter of about 3 meters. The defined proximity is also referred to as a proximity boundary. When a user moves within the proximity boundary (such as +/−1.5 meters from a selected product), the short range communication transceiver associated with the location or object can efficiently communicate with the SRC device coupled to the user's mobile computing device. The relatively small dimension of the proximity radius may be used to allow the user to conveniently identify a location or locate an object, which is located within the defined proximity, when the content is communicated.

In order to reduce unwanted wireless communication of proximity based content, and focus on the proximity based content the user is interested in, a proximity based communication filter module can be used with the mobile computing device to filter the locations and objects for which proximity based content may be wirelessly communicated. In addition, the proximity based communication filter module may filter the proximity based content that may be wirelessly communicated. In one embodiment, the user may set rules that include at least one of permissions and restrictions for proximity based communication. The rules can be stored at the mobile computing device to limit potential intrusiveness of communicating proximity based content associated with certain locations or objects. Also, the rules can limit the undesired communication of certain proximity based content or types of proximity based content associated with locations or objects. In addition, the rules may identify actions to be performed by a user's mobile computing device based on certain communicated content, the communication of proximity based content associated with certain locations or objects, or the user's presence within the proximity of certain locations or objects.

Similarly, the proximity computing device 210 may be used with a proximity based communication filter module 222 to filter which mobile computing devices may be wirelessly communicated. In addition, the proximity based communication filter module may filter the proximity based content that may be wirelessly communicated. In one embodiment, rules may be selected that include at least one of permissions and restrictions for proximity based wireless communication. The rules can be stored at the proximity computing device to limit the communication of proximity based content associated with certain mobile computing devices. Also, the rules can limit the undesired communication of certain proximity based content or types of proximity based content. For example, the rules can prevent non-authorized mobile devices from accessing content or communications within the system. In addition, the rules may identify actions to be performed by the PSRC device based on certain communicated content, the communication of proximity based content associated with certain mobile computing devices, or the presence of a certain mobile computing device within its proximity.

The ability to sharply define a desired proximity boundary can provide a significant advantage for the wireless communication of proximity based content. If an edge of the proximity boundary is substantially variable, a user may detect and/or receive content for locations or objects that may not be visible or easily discovered by the user. Certain types of ubiquitous wireless standards may not be useful to sharply define the proximity edge. Standards such as Wi-Fi, also known by the 802.11 standard from the Institute of Electronic and Electrical Engineers (IEEE), utilize Radio Frequency (RF) signals that can have a range of hundreds of feet. The RF signal may be detected in certain situations well outside of the desired range. More localized standards, such as Bluetooth® can have the same challenge, albeit for a smaller range. A typical range for a Bluetooth device can be approximately 10 meters or about 30 feet.

In accordance with one embodiment of the present invention, one or both of the SRC device and the PSRC device may include short range transceivers that can be configured to communicate using Near Field Magnetic Induction (NFMI). Unlike RF signals, which are created by modulating information onto an electromagnetic plane wave and transmitting those signals into free space, NFMI signals are created by modulating information onto a magnetic field. The magnetic field is localized around the transmitting antenna. The signal outside of this localized region is typically attenuated below the noise floor, thereby making it difficult or impossible to receive the signal. The power roll-off for an electromagnetic signal is one over the distance squared ($1/(dist^2)$), meaning that every time the distance is doubled, the power is one fourth (¼) as strong. In contrast, the power roll-off for a NFMI signal is proportional to one over the distance to the sixth ($1/(dist^6)$), meaning that every time the distance is doubled, the power is one sixty-fourth (1/64) as strong. Thus, the use of NFMI can enable a signal that can be transmitted predictably within a well defined area or distance.

However, the edge of the proximity boundary may be variable even when NFMI is used. One challenge with communicating through the use of magnetic induction is the polarization of the signals relative to the transmitter and receiver antennas. Maximum power in an NFMI signal can be communicated between two NFMI antennas with axis that are parallel to one another. Minimum power is transmitted between two antennas with antenna axis that are perpendicular to one another. The difference in transmitted power can be significant.

For instance, at 1 meter, the power received in an NFMI signal transmitted between two antennas that are substantially parallel to each other can be 50 decibels (dB) greater than the power received when one of the antennas is substantially perpendicular to the other.

The transmitter typically has no way of knowing the orientation of the receiver antenna, therefore it must transmit at the maximum (worse case) power setting of +50 dB to ensure a link distance of 1 meter when the antennas are perpendicular with one another.

In an NFMI system, the power roll-off is 60 dB per decade. Therefore 50 dB correlates to 0.833 decades (50 dB/60 dB) or an increased link distance of 6.8 times ($10^{\wedge}0.833$). Thus, if the transmitter and receiver antenna are optimally positioned (i.e., parallel) while the transmitter is at full power (+50 dB), the link distance will reach out to 6.8 meters instead of 1 meter. This means that an NFMI link will have a range from approximately one to seven meters. This wide range, which depends on the orientation of the transmitter and receiver antennas, substantially reduces the ability to sharply define a selected proximity around a location or object.

One way of dealing with the challenge of a variable proximity edge caused by antenna misalignment is to design one or both of the transmitter and receiver with multiple orthogonal antennas. This ensures that at least one of the receiving antennas will be substantially parallel to the transmitting antenna regardless of the relative alignment between the transmitter and the receiver. In one embodiment, the signal can be received at a receiver having multiple orthogonal antennas. A portion of the signal can be received on each of the orthogonal antennas and summed, thereby maximizing the signal no matter the orientation. Alternatively, one or more of the antennas can be selected to transmit or receive based on strength of the signal.

The PSRC device associated with the location or object can also include multiple orthogonal antennas, enabling the device to receive NFMI signals broadcast from the user's mobile computing device no matter what the orientation is between the two transceivers. In one embodiment, the antenna that is used to receive the signal can also be used to transmit. The antenna may be used to transmit on the assumption that it is the best aligned antenna with the antenna on the receiving transceiver, thereby maximizing the link distance and minimizing the power needed to communicate between the two transceivers. This, in turn, reduces the emission levels of the transceiver.

In one embodiment, the use of multiple antennas to communicate a signal is referred to as antenna diversity. When the antennas are used to communicate a magnetic induction signal, antenna diversity refers to the use of multiple orthogonal antennas that are directly connected to a single transceiver. This is different than antenna diversity used in transmission schemes such as Multiple Input Multiple Output (MIMO), wherein multiple antennas are used to perform spatial multiplexing to decrease signal loss through channel fading. The use of multiple orthogonal antennas to receive a magnetic induction modulated signal will be referred to as magnetic induction diversity. In one embodiment, the use of magnetic induction diversity can be used in combination with spatial diversity to allow the benefits of both spatial diversity and magnetic induction diversity to be accomplished.

Magnetic induction diversity can be the selection of the best aligned antenna to receive or transmit with another transceiver. Alternatively, magnetic induction diversity can involve summing the signal on two or more antennas. The use of magnetic induction diversity enables the variability of the proximity boundary to be substantially reduced. Since, in a system with multiple receiver antennas positioned in orthogonal planes, a receive antenna can always be selected that is significantly aligned (i.e., parallel) with a transmit antenna, it reduces the need to significantly increase the transmit power to ensure that the signal can be received at a selected distance independent of its relative orientation with the transmit antenna, and vice versa. It should be noted that the use of NFMI transceivers does not, by itself, constitute magnetic induction diversity. The distance over which a magnetic induction device can communicate (i.e. a range) when using magnetic induction diversity can depend on a number of factors, including but not limited to a communication range of a transmitter and a receive sensitivity of a receiver. A number of additional factors can also contribute including the degree of orthogonality, the number of transmit and receive antennas, the shape and size of the antennas, the transmitter output power, the efficiency of the receiver, and so forth.

The transmit power in each of the NFMI transceivers can be set at a level to define a desired radius of a proximity boundary. The transceivers may be designed so that the proximity boundary may be substantially circular. Alternatively, the antennas on the short range transceiver associated with the product can be designed to provide a radiation pattern of a desired shape, such as a narrow arc or conical pattern, thereby providing additional accuracy for the user to identify the location or object associated with the PSRC device.

In one embodiment, the proximity signal that defines the proximity boundary can contain information. The information may be related to the PSRC device, such as a location of the PSRC device or a product or service associated with the PSRC device. The information carried on the proximity signal can also be information that is related to the SRC device such as set user preferences, filter settings, a user identification value, and so forth. Thus, the proximity signal can be a bidirectional signal that is used to both define a boundary and carry unidirectional or bidirectional information between the SRC device and the PSRC device using near field magnetic induction (NFMI).

As described herein, NFMI is ideally suited as a communications technique for the wireless communication of the proximity based content, particularly when magnetic induction diversity is employed. However, the present invention is not limited thereto as other communications techniques may be alternatively or additionally be employed. For example, the use of location determination technologies, such as the Global Positioning System (GPS) or the triangulation of RF signals, may be implemented to determine if the user is within the limited proximity of the location or the object. Nevertheless, the description of the example embodiments of the present invention will be limited to NFMI for conciseness in explanation.

By limiting the proximity to the location or the object to a relatively small distance, the resulting characteristics of this arrangement may be exploited for diverse applications ideally suited thereto. For example, the wireless communication of proximity based content may include implementations for proximity based messaging, proximity based location services, proximity based security, proximity based marketing, etc.

However, for conciseness in explanation, example embodiments of the present invention may be described in the context of techniques for proximity based marketing. However, the present invention is not limited thereto and the descriptions thereof may equally be applicable to other implementations of the present invention, including, but not limited to, proximity based messaging, proximity based location services, proximity based security, proximity based marketing.

Proximity based marketing is a particularly beneficial implementation of the wireless communication of proximity based content because it allows a user to locate, become informed about, and purchase desired items or services while being located within a proximity of the product or information regarding a service. Proximity based marketing can also include the communication of financial incentives such as coupons or rebates for products. In order to increase the readability of the description of the techniques for proximity based marketing, different terms than those utilized above may be referred to below. For example, the term "consumer" may be interchangeably used with the term "user". Also, the language "location or object" may be interchangeably used with the term "product". In addition, the language "proximity based content" may be interchangeably used with the term "proximity based marketing". Still further, the language "proximity based communication filter module" may be interchangeably used with the language "proximity solicitation filter module." Also, reference to the term "coupon" is used as a specific example of content and examples including a "coupon" can be more broadly construed as including any desirable type of content. Similarly, reference to a Point of Sale (POS) terminal is a specific example of a type of proximity computing device, although many other types of proximity computing devices may also be used.

Advertisement communications can be sent to the customer when he or she is located within the proximity of a selected product. Herein, the selected product may be described as being located in the store for convenience of description. However, the present invention is not limited thereto as the selected product may be located anywhere. The advertisement communication can inform the customer of information about a product as well as promotions that may be offered for the product. A promotion, such as a coupon or rebate, can be stored on the customer's mobile computing device.

A POS terminal is a terminal, typically located at a store or other type of sales location, which is used to conduct a financial transaction, such as a sale of goods. A common form of POS terminal is a cash register. The POS terminal may include wireless communications capabilities that allow it to communicate with the SRC device. The coupon or other type of promotion which has been received by the mobile computing device and stored on the mobile computing device can then be wirelessly communicated from the mobile computing device to a Point Of Sale (POS) terminal, thereby enabling the customer to take advantage of the coupon. Alternatively, the coupon may be stored on the customer's mobile computing device for use at a later time. However, the customer does not need to keep track of the coupon. In one embodiment, the POS terminal can poll the mobile computing device for any coupons related to products that are purchased at the POS terminal, thereby enabling the consumer to take advantage of the coupon for weeks or even months after it is stored on the mobile computing device. The polling of the mobile computing device, or the transfer of coupons from the mobile computing device to the POS terminal, is not limited to NFMI communications. For example, a coupon may be transferred via NFMI to the mobile computing device, but once stored on the mobile computing device, the coupon may be further transmitted using other communication methods. Some example communication methods or protocols which may be native to the mobile computing device may include, for example, NFC, Bluetooth, WiFi, Third Generation Partnership Project (3GPP) Long Term Evolution (LTE), Worldwide Interoperability for Microwave Access (WiMAX), optical link, acoustic link, infrared, wired, and so forth.

To facilitate compatibly with a conventional POS terminal, and as one example of an optical communication, the coupon may be displayed as a barcode on a display of the customer's mobile computing device that is scanned by a barcode reader of the POS terminal. The displayed barcode may include information identifying all of the coupons stored on the customer's mobile computing device. Also, the coupon may be displayed as an alphanumeric code that can be manually entered into the POS terminal.

Storing the coupon on the mobile computing device enables the coupon to be used, even if the consumer no longer remembers the coupon. Coupons may be used until the date at which they are set to be expired. The expiration date can be stored with the coupon and monitored by the mobile computing device or the POS terminal when the coupon is uploaded to the POS terminal. The mobile computing device may also be configured to notify the user that a coupon is about to expire. The notification may be in the form of text, graphical, sound, vibration, or a combination of these elements. The notification can be set to remind the user at predefined intervals prior to the coupon's expiration. When the consumer is notified, the consumer may set an alarm notification alert to reappear at a later time, prior to the expiration of the coupon. The notification can originate from the mobile computing device or from a third party. For example, stored coupons can be made available from a third party via a wireless connection (such as by using cellular based communications such as 3GPP or WiMAX, for example), and a notification or announcement can be sent to the user from the third party. The notification/announcement from the third party can be sent using traditional wireless or cellular technology (e.g., 3G), or can be sent to the user via text, email, social networking, and the like. Similarly, the notification can be sent to a user's cloud based storage where it can be viewed by the user.

Moreover, a portion of the coupon may be stored in a "cloud" storage facility that is associated with the consumer's mobile computing device. For instance, a multimedia portion of the coupon may be streamed from a cloud storage facility. The actual data stored on the mobile computing device regarding the coupon can be a limited amount of data, such as sufficient data to identify the coupon to the POS terminal. For example, a numeric or alphanumeric code may be stored on the mobile computing device for transmission to the POS terminal, while multimedia related to the coupon may be stored and/or streamed from a cloud storage facility.

In addition, the advertisement or solicitation may be stored locally and triggered by a proximity event at a later time. For example the coupon may be received via an email, text message, instant message, social media, etc. and stored on a mobile computing device. The consumer can be notified when the mobile computing device is within a proximity of the product associated with the coupon. Also, the coupon can be entered into the mobile computing device manually, or by performing an optical scan of a physical coupon, barcode or the like. In one aspect, coupons can be received as the result of an electronic subscription, a web search, etc. In another aspect, coupons can automatically be retrieved from a database, from the internet, etc. based on a shopping list entered into the mobile computing device.

In some examples, coupons, price comparisons, rebates, and so forth can be searched and/or retrieved via a wireless connection when the consumer is in proximity to a product. Some or all of the information can be retrieved from the store or location of the consumer, while some or all of the information can also be retrieved via the internet, or other networks or databases. In some examples, coupons may be pre-loaded into the mobile computing device. When the consumer is in proximity to a product for which the consumer has a coupon, an alert can be provided to the consumer when the consumer is near the desired product.

Alternatively, coupon scraping and price comparison research may be conducted by a consumer at a later time based on information obtained while in the proximity of a product. For instance, a consumer may receive information that allows the consumer to determine a price offered for a product. The consumer can then use his or her mobile device to compare that price with other prices available on the internet. In addition, the consumer may obtain a coupon or other type of discount that is available on the internet for that product.

In order to reduce unwanted advertisements, and focus the advertisements on products that the consumer is interested in, the proximity based communication filter module can be used to enable a user to identify the products and markets that he or she is interested in. Hereafter, the proximity based communication filter module may be referred to as the proximity solicitation filter module. The consumer can set solicitation rules. These rules can be stored on the mobile computing device to limit potential intrusiveness of marketing for unwanted products and markets as the consumer walks through a store.

More importantly, the consumer is in control of his or her own information. The consumer can use his or her own mobile computing device to store the solicitation rules, and store information related to advertisements on the mobile computing device. By storing the information on the user's mobile computing device, rather than relying on a store or other entity to store the information, it significantly increases user privacy and reduces the risk of loss of consumer information for the store and significantly eliminates the risk of misuse or undesired use of the consumer's information by another entity.

The rules can be set for each product or a group of products. One rule that the user can set is to identify whether the user wants to receive information on the user's mobile computing device about a selected product or group of products. Another rule that may be set is whether the user wants to receive information related to a discount such as a coupon or rebate. More complex rules can also be set. This will be discussed more fully below.

If the rules are setup to ignore a selected product, or class of products, then the consumer may not be notified and the consumer's mobile computing device may not be activated. Depending upon the types of rules setup by the consumer, the consumer may be notified and/or an advertisement such as a coupon may be received and stored on the consumer's computing device.

As described above, the ability to sharply define a desired proximity boundary can provide a significant advantage, and this is particularly true for proximity based marketing. If an edge of the proximity boundary is substantially variable, a consumer may receive notifications for products that may not be visible or easily discovered by the consumer. This aspect will be described in greater detail below with reference to FIG. 1 in the context of a proximity based marketing system as a specific example of a system for the wireless communication of proximity based content.

FIG. 1 is an example illustration of a proximity based marketing system in accordance with an embodiment of the present invention. While a proximity based marketing system is illustrated in FIG. 1 and described herein, the constituent elements and functions thereof may be equally applicable to other implementations of the wireless communication of proximity based content.

Referring to FIG. 1, an example is illustrated of a PSRC device 104 located on a store shelf 106 adjacent to a selected product. The PSRC device 104 may be disposed in a proximity computing device. The PSRC device 104 is configured to communicate using NFMI. The PSRC device 104 is configured to transmit a signal with sufficient power so that the signal is detectable in a proximity boundary. In this example, the proximity boundary has a distance of approximately 6 feet from the PSRC device 104. The radius of the inner circle 108 represents the distance of 6 feet. A consumer 112 can carry a mobile computing device 110 having an SRC device configured to receive the NFMI signal broadcast by the PSRC device 104.

If both the SRC device on the mobile computing device 110 and the PSRC device 104 include only a single antenna, then the power of the NFMI signal transmitted from the PSRC device needs to be sufficient to ensure that the signal can be received at the mobile computing device 110 at the perimeter of the inner circle 108 even when the antenna of the SRC device at the mobile computing device 110 and the antenna of the PSRC device 104 are poorly aligned (i.e., substantially perpendicular). As previously discussed, the power needs to be increased approximately 50 dB (i.e., 10,000 to 100,000 times) for this to be achieved.

However, when the antennas of the SRC device at the mobile computing device 110 and the PSRC device 104 are better aligned, then the NFMI signal may be received anywhere within the outer circle 114, which represents a radius that is seven times greater than the inner circle 108. A consumer 112 having a mobile computing device 110 with an antenna that is coaxial to or parallel with the antenna of the PSRC device 104 may detect the NFMI signal several rows away from the actual product. In fact, each person illustrated in FIG. 1 may be able to detect the signal based on the alignment of the respective antennas.

If one or both of the PSRC device 104 and the SRC device on the mobile computing device 110 included multiple orthogonal antennas that use magnetic induction diversity to receive and/or transmit the NFMI signal, it can be ensured that the receiver and transmitter antenna are substantially optimally aligned, thereby enabling a substantially maximum amount of the possible power to be received independent of the position of the SRC antenna at the mobile computing device 110 relative to the antenna of the PSRC device 104. This enables the uncertainty area (i.e., the area between the outer circle 114 and the inner circle 108) to be substantially reduced, thereby enabling the PSRC device to be designed with a desired proximity area with minimal uncertainty area.

The size of the proximity boundary 108 and the uncertainty area outside of the proximity boundary is determined by the transmit power of either the PSRC device 104 or the SRC device on mobile computing device 110, the receive sensitivity of either the PSRC device 104 or the SRC device on mobile computing device 110, and/or antenna alignment. These factors, individually or in combination, can facilitate optimal communication coupling which provides a well defined edge of the proximity boundary.

In another embodiment, a display external from the user's mobile computing device can be in communication with the PSRC device 104. When the consumer passes within the defined proximity, and the rules on the consumer's mobile computing device are set to allow the SRC to receive information from the PSRC, the PSRC may send a request message to the consumer's mobile computing device, which can respond with an acknowledgement message that the consumer is interested in the product (based on the set rules). The external display can then be used to display a selected advertisement and/or provide promotional information, coupons, rebates, and so forth. The external display may be located proximate to a desired product. Alternatively, the external display may be mobile. For example, the external display may be located on a shopping cart. When a user comes within proximity of a selected product, as determined by a communication between the PSRC device 104 and the SRC device on the mobile computing device, the mobile display can be used to display desired content related to the selected product. For instance, the information may be sent from the SRC device, the media communication device, the PSRC device, or the proximity media communication device. Alternatively, the information may be previously stored in the mobile display and displayed on the mobile display in connection with the user entering the proximity boundary. Any means may be used to communicate to a display of a product when the user is identified as entering a defined proximity boundary by one of the SRC device and the PSRC device.

In one embodiment, in order to provide additional privacy to the user, information may be sent from the PSRC and either received or ignored by the mobile computing device based on preference settings. This may be a strictly unidirectional link with no feedback back to the PSRC from the SRC on the mobile computing device. The PSRC device may not receive any information regarding whether the information transmitted has been received at the mobile computing device.

In another embodiment, the SRC device coupled to the mobile computing device can transmit a proximity signal. When the mobile computing device is within a defined proximity boundary associated with a PSRC device (i.e., the mobile computing device is within a defined proximity of a product), the proximity signal transmitted by the SRC device can be received by the PSRC device. The PSRC device can then transmit information identifying the product with which it is associated.

Alternatively, the PSRC device may be a passive device, such as a passive Radio Frequency IDentification (RFID) device that is not actively powered (i.e., is not connected to a power source). In this embodiment, the proximity signal may include information or may be a null signal configured to activate the passive PSRC device using energy from the proximity signal. When the proximity signal is communicated from the SRC device to the PSRC device then a signal can be reflected from the passive PSRC device and received at the SRC device. The reflected signal can include information identifying the product that is associated with the PSRC device.

The consumer may be given the option of manually selecting whether or not to receive information related to the product, such as a coupon, on his or her mobile computing device. For instance, the consumer may press a soft key on the external display giving permission to send the information to the consumer's computing device. This enables the consumer to receive information about products according to the rules set by the consumer, while not requiring the consumer to use his or her mobile computing device, thereby enabling the consumer to leave the computing device in their pocket, purse, or other storage location as they walk through a store.

An example of a proximity based marketing system as a specific example of a system for the wireless communication of proximity based content is described below with reference to FIG. 2.

Figure 2:
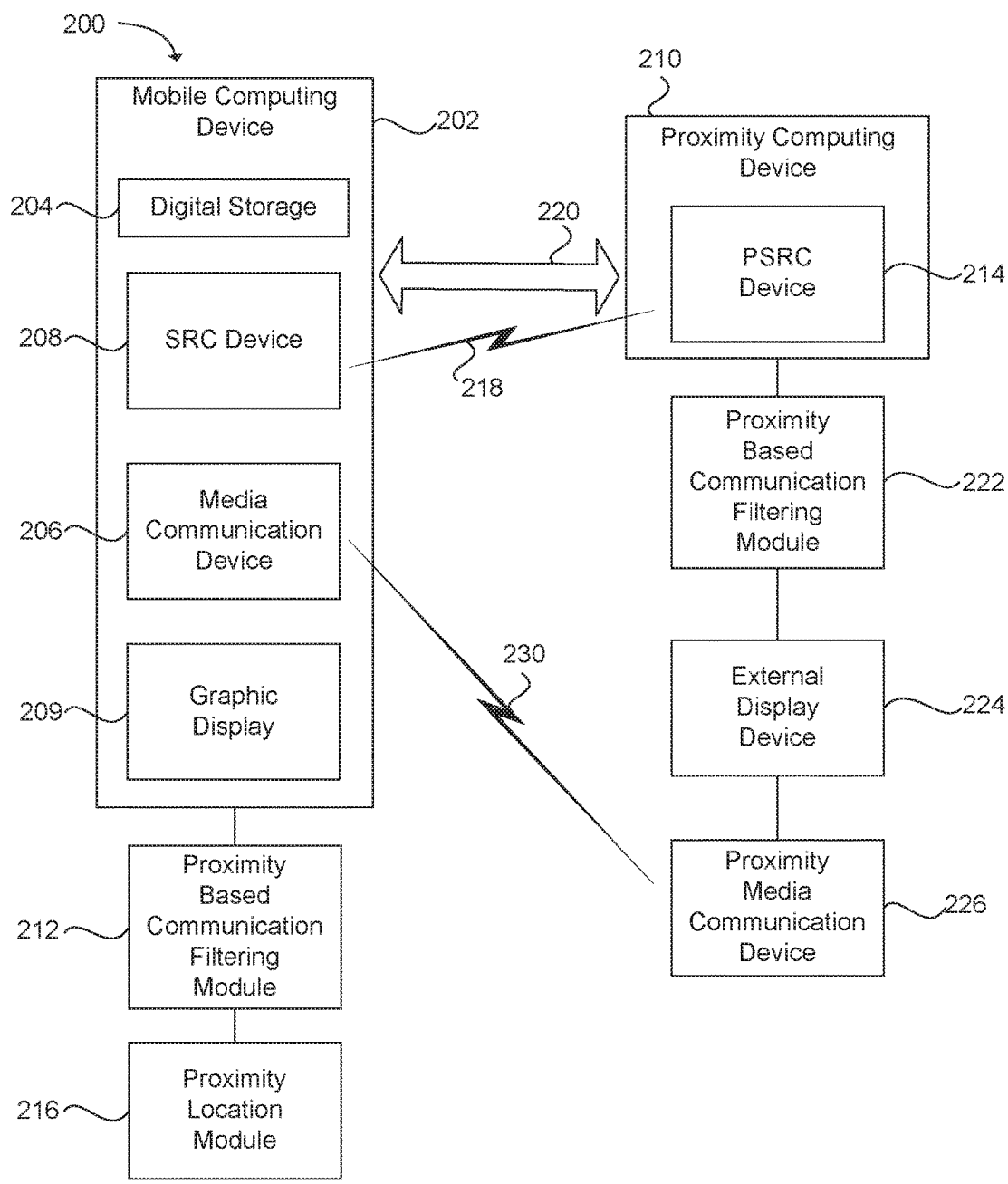
FIG. 2 illustrates an example block diagram of a system for proximity based marketing in accordance with an embodiment of the present invention.

FIG. 2 illustrates an example block diagram of a system for proximity based marketing in accordance with an embodiment of the present invention. While the proximity based marketing system 200 is illustrated in FIG. 2 and described herein, the constituent elements and functions thereof may be equally applicable to other implementations of the wireless communication of proximity based content.

Referring to FIG. 2, the proximity based marketing system comprises a mobile computing device 202. As described above, the mobile computing device 202 can be a handheld computing device, a portable multimedia device, a smart phone, a tablet computing device, a laptop computer, an embedded computing device or similar device. The mobile computing device 202 can be a mobile computing device that is owned by, or otherwise associated with, the store in which it is used. Alternatively, the mobile computing device 202 can be a mobile computing device that is not owned by the store in which it is used. In other words, the mobile computing device 202 can be a device that is customer owned, rented, leased, associated with, or otherwise in the possession of the customer. A customer owned device can include mobile computing devices that are actually owned by relatives, friends, employers, or other types of associates of the customer.

The mobile computing device 202 can include a digital storage 204. The digital storage 204 may be a magnetic digital storage such as a hard disk, an optical digital storage such as an optical disk, a solid state digital storage such as a Dynamic Random Access Memory (RAM) or a persistent type digital storage such as a flash RAM. Other types of digital storage may also be used, as can be appreciated. The digital storage 204 may be integrated in the mobile computing device 202. Alternatively, the digital storage 204 may be located in a cloud computing storage site that is in wireless communication with the mobile computing device 202. Access to the cloud computing storage site can be controlled by and limited by the user of the mobile computing device 202. Access to the cloud computing storage site may be granted to others by the user. In one example embodiment, the cloud computing storage site can be accessed via a proximity computing device 210.

The mobile computing device 202 can include an SRC device 208 that is coupled to the mobile computing device 202 and enables the mobile computing device 202 to transmit and receive information within a defined area. The SRC device 208 can be integrated with the mobile computing device 202. Alternatively, the short range communication device may be an external device that can be plugged into the mobile computing device 202 to enable information to be sent from and received by the mobile computing device 202.

A PSRC device 214 can be disposed in a proximity computing device 210 that is located at a product location. The product location may be a store shelf, a location in a factory or warehouse, a kiosk, a toll booth, an attraction at an event, a booth at a tradeshow, a point of entry, and so forth. The system is configured to establish a short range wireless communication link 218 between the PSRC device 214 and the SRC device 208 coupled to the mobile computing device 202 when the mobile computing device 202 is within a selected distance 220 of the proximity computing device 210. In one embodiment, the short range wireless communication channel may only communicate using near field magnetic induction communication. The short range wireless communication channel can be referred to as a proximity communication channel. At least one of the SRC device 208 and the PSRC device 214 may have a plurality of antennas and use magnetic induction diversity to identify the best antenna to transmit and/or receive a signal. In one embodiment, the selected distance 220 between the two devices may be less than or equal to approximately a wavelength of the carrier signal ($\lambda$) divided by 2pi ($\lambda/2\pi$). This will be discussed more fully below.

The system 200 further comprises a proximity based communication filter module 212 that is configured to enable a user to set rules for the mobile computing device 202 to act on a communication received from the PSRC device 214. The proximity based communication filter module 212 may be referred to as a proximity solicitation filter module. The rules set by the user are dependent on the type of product associated with the PSRC device 214. For instance, a wireless communication from the PSRC device 214 can be received by the SRC device 208 coupled to the mobile computing device 202. The wireless communication can include information identifying the type of product associated with the PSRC device 214. The rules set using the proximity based communication filter module 212 can identify whether the mobile computing device 202 will respond to the wireless communication. If the user has set the rules to identify that he or she is not interested in the product, or the line of products associated with the PSRC device 214, then no action may be taken by the mobile computing device 202 and the wireless communication may be ignored. Alternatively, if the user has set rules to receive an advertisement communication for a product or line of products associated with the PSRC device 214, then the mobile computing device 202 can respond based on the set rules and the information can be viewed and/or saved using the mobile computing device 202 or one or more external viewing devices.

In one embodiment, the proximity based communication filter module 212 can be configured to enable the user to select product categories, rather than identify each particular product that he or she is interested in. For instance, the consumer may identify that he or she is interested in categories such as fruit, meat, or vegetables. Other categories that the user may select include the manufacturer, such as Post® brand cereals. The consumer may identify that he or she is interested in the "manager's special" of the day. The consumer may also select a predefined set of preferences based on the consumer's interests, such as a sportsman, a cat lover, a mother of a large family with small children, and so forth. A predefined preference may also be obtained from friends, relatives, or peers. For instance, a predefined preference may be obtained from a social networking group. Other categories can be applied as well, as can be appreciated.

In one embodiment, the proximity based communication filter module 212 can be configured to provide learned preferences to help guide or narrow the rules for the consumer. The proximity based communication filter module 212 may use data from items that were actually purchased to help focus the learning algorithm or process. For instance, the frequent purchase of certain products can weight the learning process based on the type of product(s) purchased.

In another embodiment, the proximity based communication filter module 212 can be configured to learn the buying preferences of the consumer. For instance, the consumer using the mobile computing device 202 can turn on the learning feature in the proximity based communication filter module 212. As the consumer purchases products, the rules for the products can be set so that the user can receive advertisement communications for the purchased products, or for categories of products related to the purchased products. For instance, if the consumer purchases bananas and the learning feature is enabled, the proximity based communication filter module 212 may set the rules for products related to bananas, such as other fruits or ice cream and hot fudge to be set to receive advertisement communications at the mobile computing device 202. Similarly, when a consumer purchases a breakfast cereal, the rules for related products may be set by the module to receive advertisement communications.

In one aspect, the proximity based communication filter module 212 rules can be overridden or updated in real time, for example, by bringing the mobile computing device 202 within a very close range of a close proximity communication device for a product or location, such as within 10 centimeters to allow the SRC device to communicate with the PSRC device in accordance with an NFC standard implementation. The rules can be automatically overridden and/or updated when brought within a specified range. Alternatively, when the devices are brought within an NFC range of less than 10 cm, a prompt may be displayed on the mobile computing device asking the user whether to override the rule(s).

In one embodiment, a location of the user in a store may be tracked based on an interaction between the short range communication device in the mobile computing device 202 and each PSRC device that is located within a proximity of a selected product in the store. A history of the user's location in the store may be stored on the mobile computing device. The location and track of the person through the store may be used by the proximity based communication filter module 212 to identify selected products and set the related rules for the products to enable the products to be identified by the mobile computing device 202. For instance, if a consumer spends a significant amount of time in a baby products section of a store, the proximity based communication filter module 212 can be configured to adjust settings for baby products. The consumer may be queried to accept selected changes based on the history. Alternatively, these changes may be made automatically.

The settings in the proximity based communication filter module 212 may also be updated based on the consumer's purchase history. For instance, if the consumer purchases water nearly every time the consumer shops at a store, the consumer may be queried concerning settings for water related products sold at the store, or other stores.

In one embodiment, information about the user, such as the user's location, purchasing history, and so forth, can be shared with a store or location in exchange for coupons, loyalty points, membership rewards, contest registrations, and so forth. Tracking user information and sharing the information with the store or location can allow the store/location to improve features such as display location, product placement, and so forth based on the user's walk path, behavior patterns, etc.

In another embodiment, proximity-related stored information including the user's tracked location at selected places such as stores, businesses, or other public or private locations, along with the user's purchasing history at that location and other information stored in the mobile computing device such as custom filter preferences, user settings, social network profiles, and so forth can be shared with another computing device. The other computing device may be connected to the internet. When the user approaches a computing device, such as a tablet computer, a laptop computer, a desktop computer, a point of sale terminal, or another type of mobile computing device such as a mobile phone, the information stored on the mobile computing device can be communicated. The information can then be used at the second computing device to influence the advertisements and marketing promotions received on the computing device. Advertisements and marketing promotions that are associated with the proximity-related stored information can be received at the second computing device through any type of wired or wireless connection. For example, advertisements and marketing promotions may be received via an internet browser, a search engine, an email application, an on-line shopping website, a social networking site, and so forth. Alternatively, the advertisements and marketing promotions may already be stored on the second computing device. They can then be communicated from the second computing device based on the proximity-related stored information received from the mobile computing device.

In one example embodiment, the second computing device may operate on a cloud based operating system such as Google Chrome®. The cloud based operating system may offer advertising on the second computing device. The type of advertisements communicated by the second computing device can be selected based on the user's purchasing history, location history, and so forth that is stored on, or associated with the user's mobile computing device and shared with the second computing device. The location history may be a defined geographic path through a selected location, such as a store. Alternatively, the location history may be associated with the types of products that a user passes while walking through a store or building. This enables vendors to determine if their products are appropriately located. In addition, the vendor or store owner can identify if a person may be interested in a product by the number of times that the user has passed the product, or the amount of time spent near the product in a store.

A computing device with a local operating system can provide advertisements through an internet browser. The advertisements can be specialized to the needs of the user based on the user's purchasing history and location history that is communicated from the mobile computing device.

In one embodiment, the use of the historical information available on the mobile computing device can be limited to the store or location at which the information was gathered. For instance, the user may shop at Costco®. The user's purchasing history and shopping route through the store may be accessed when the user is shopping on a Costco® website, or a website with an affiliation with Costco®. This information can then be used to provide the user with relevant advertisements based on the user's purchasing history and behavior in the Costco® store.

In another embodiment, the historical information, including the user's filter preferences, purchasing history, and location history, is not limited to the store or location at which the information was gathered. For instance, the historical information gathered at a store such as Costco in the example above may be used at another location such as Wal-Mart® or another type of business or location entirely, such as a movie theater or hotel. The historical information can be used to provide the user with relevant advertisements or discounts at the other locations.

In another embodiment, the user's purchasing history and location history can be used to influence the results that are provided in an internet search. If the user purchases specific brands, the owners of those brands may pay the search engine provider to list their websites near the top of the search. Advertisements are not just provided within the construct of a web browser or an operating system. They can also be provided in association with a user's email, social networking sites, applications, and so forth.

In another embodiment, advertisement information can be communicated to the mobile computing device by a point of sale (POS) terminal, kiosk, advertisement terminal, or the like. The advertisement information that is communicated can be determined by the user's proximity-related stored information that is available on the mobile computing device. The information may be passively communicated with no action needed by the user. Alternatively, the user may be queried to determine if the user is interested in receiving information about a selected product or service and information will only be sent upon authorization by the user. The user may also pre-authorize the receipt of advertisement information related to the user's purchases and/or interactions with a PSRC device associated with a product.

In addition, the user's purchasing history can also be used to assist the user in making purchases through a store's website. For example, when the user opens a website for a store which uses PSRC devices to communicate with an SRC device on the user's mobile computing device, the user's purchasing history can be communicated and analyzed. The website can allow the user to purchase those same items without needing to individually locate each item on the website. This can allow the user to quickly purchase every day items without the hassle of locating each item on the internet.

The ability to use historical information located on the mobile computing device to personalize advertising provides significant benefits. The advertisements can be of greater interest to the user since they are directed to products or services actually purchased by the user, or to products or services related to the user's purchases. In addition, the historical information can be communicated to substantially any type of computing device. This allows the personalized advertisements to be displayed on computing devices that the user has never used before. Moreover, the historical information can be more accurate than information that is obtained about the user in other ways, such as the user's web surfing habits. Since the historical information pertains to actual purchases, and not just web sites and web searches, the historical information can be substantially more accurate and therefore valuable to an advertiser.

While it is possible to communicate the user's purchasing history, location history, and other information from the mobile computing device using magnetic induction, it is not necessary to do so. The information may be communicated using a standardized communication protocol or communication means such as NFC, Bluetooth, IEEE 802.11, IEEE 802.15, IEEE 802.16, 3GPP LTE, an optical link, an acoustic link, a wired link, and so forth. In addition, the mobile computing device itself may include a cloud based operating system or be connected with the internet. Thus, advertisements displayed on the mobile computing device can be based on the user's purchasing history and location history, without the need to communicate the history to another computing device.

In one embodiment, the proximity based communication filter module 212 may be located on the mobile computing device 202. The user can interact with the proximity based communication filter module 212 through a user interface on the mobile computing device 202. Alternatively, the proximity based communication filter module 212 may be located on a separate computing device, such as a user's home computer or a cloud computing location that is accessible through a network or the internet. In one embodiment, the proximity based communication filter module 212 may be a computer program operating on the user's home computer or at a location accessible through the internet to assist the user in identifying desired products and/or product lines in which the user is interested in receiving advertisements. The user's identifications can be translated by the proximity based communication filter module 212 to set rules for selected products. The set rules can then be communicated to the mobile computing device 202 and stored in the digital storage 204.

In one embodiment, when a proximity communication is received from the PSRC device 214 (i.e., when proximity is detected via the proximity communication link 218) and one or more rules are set in the mobile computing device 202 to receive an advertisement communication for a product or line of products associated with the PSRC device 214, the advertisement communication can be communicated to the mobile computing device 202 over the proximity communication link 218.

In one embodiment, the system 200 further comprises a proximity based communication filter module 212 that is configured to enable a user to set rules for the proximity computing device 210 to act on a communication received from the mobile computing device 202. In one aspect, the communication filter module 212 can also enable a user to control what information is transmitted over an extended range or to what devices the information can be transmitted.

In another example embodiment, a separate wireless channel may be established with the mobile computing device 202 to receive the advertisement communication. For instance, the mobile computing device 202 can include a media communication device 206 that can be configured to communicate with wireless devices using one or more types of wireless communication standards, such as Bluetooth®, Wi-Fi, Zigbee®, WIMAX®, IEEE 802.16, 3GPP, 3GPP2, 3GPP LTE, GSM, CDMA, UHF, VHF, UWB, or another type of wireless communication standard capable of transmitting data, text, audio, and/or video images. When the proximity communication is received at the SRC device 208 from the PSRC device 214 via the proximity communication link 218 and proximity has been established, then the mobile computing device 202 may send an acknowledgement signal to the PSRC device 214 via the SRC device. Alternatively, the acknowledgment may be sent via another wireless device such as the media communication device 206 to the proximity media communication device 226, giving permission to send the advertisement communication over a media wireless communication link 230 from the proximity computing device 226 to the media communication device 206 using the selected wireless communication standard. The advertisement communication can then be transmitted to the media communication device 206 operating on the mobile computing device 202 through the media wireless communication link 230. Alternatively, the establishment of proximity may be determined at the proximity computing device 210 and an acknowledgment may be communicated to the mobile computing device 200 via a desired communication path such as the proximity communication link 218.

The proximity media communication device 226 may be located adjacent the proximity computing device 210 at the product location. Alternatively, the proximity media communication device 226 may be used to transmit multiple advertisement communications for a plurality of products and can be located in a separate part of a store or building from the product location. The proximity media communication device 226 may even be located outside of a store or building in which the products are located. For instance, the media communication device may be a cell tower radio configured to communicate with the mobile computing device 202.

In one embodiment, the mobile computing device 202 and/or the PSRC device 214 can communicate an identification of the product associated with the PSRC device 214 to the proximity media communication device 226. The communication can be defined as a proximity event. The proximity event can allow the mobile communication device 200 to establish communication with, and/or allow a communication from a proximity computing device 210. The proximity event can initiate and/or authorize the transfer of proximity information about a selected product such as coupon information to the mobile computing device. The proximity computing device may make a request to a remote storage location. The proximity computing device may receive the information from the remote storage location and then transfer the information directly to the mobile computing device. Alternatively, the information may be transferred directly from the remote storage location to the mobile computing device. In one embodiment, the advertisement communications from the proximity media communication device can be provided by a third party, a product manufacturer, a promoter, a marketing group, or the like. In one embodiment, the proximity media communication device 226 can communicate the advertisement communication for the selected product or line of products to the mobile computing device 202 over the media wireless communication link 230, as previously discussed. The proximity media communication device 226 can be configured to broadcast or stream a plurality of media communications simultaneously to a plurality of different consumers.

In one embodiment the advertisement communication for a product associated with the PSRC device 214 can be displayed on a graphic display 209 of the mobile computing device 202. The product advertisement can deliver information to the consumer about the product. The advertisement can also include financial incentives to the consumer to purchase the product, such as a coupon, rebate, membership or contest entry, or other type of financial incentive, as previously discussed.

The advertisement communication may be interactive, thereby giving the consumer the opportunity to accept or reject the financial incentive. For instance, the consumer may be queried as to whether they would like to receive a coupon for the product. The consumer can respond using hardware and/or software on the mobile computing device 202 to interact with the graphic display 209, as can be appreciated. When the consumer selects the affirmative in response to the query, the coupon can be saved in the digital storage 204 associated with the mobile computing device 202.

In one embodiment, the coupon may comprise a bar code that is displayed on the graphic display 209 of the mobile computing device 202. Alternatively, the coupon may be identified through a numeric or alphanumeric code stored in the digital storage 204. The coupon may be from the store in which the product is sold. Alternatively, it may be a coupon produced by the manufacturer of the product or a 3rd party. The coupon may only be redeemable in the store in which the product is sold and the coupon is received. Alternatively, it may be redeemable in any store at which the product is sold.

In one embodiment, a proximity event, or the detection of proximity between the mobile computing device and the proximity computing device, can trigger coupon scraping to occur. Coupon scraping comprises a search of the Internet, an intranet, or an accessible database for coupons or information related to the product or to similar products. These coupons or information can be accessible and viewed via the mobile computing device. These coupons or information may be stored locally on the mobile computing device. The coupons or other type of information can be communicated to the POS terminal using at least one of the proximity communication link 218 or the wireless communication link 230 or methods previously described.

In one embodiment, the advertisement communication that is displayed on the graphic display 209 or an external display 224 can be varied based on the season, an upcoming holiday, a time of day, an inventory level of the product, a weather forecast, and so forth. For instance, a user may set the proximity based communication filter module 212 to inform the user when a sale of at least 10% off is occurring on products that the consumer would not normally choose to be informed about. The 10% off sale may occur when the season is ending, or when there is excess inventory on a perishable product.

In another embodiment, an external display device 224 may be used to display the advertisement communication when the proximity based communication filter module 212 includes the set rules to receive the advertisement communication for the associated product or line of products and the SRC device 208 has received a signal from the PSRC device 214, signifying that the consumer is within the distance 220 of the product. The use of an external device or user interface to display the advertisement enables the mobile computing device 202 to remain stored in the consumer's pocket, purse, or other desired storage area to allow the user to passively participate in the promotion.

In one embodiment, the external display device 224 can be interactive. For instance, after displaying an advertisement communication, the external display device 224 can query the consumer as to whether the consumer would like to receive additional information on his or her mobile computing device 202. The additional information may include coupons, rebates, or other types of information that may be of interest to the consumer such as nutritional information, product catalogs, trailers for a movie, an associated TV commercial, and so forth. Selected information, such as coupons or rebates, can be stored in the digital storage 204 at the mobile computing device 202. The digital storage 204 at the mobile computing device 202 can include the cloud computing storage site. The additional information can be communicated to the mobile computing device 202 using the proximity communication link 218 and/or the media wireless communication link 230. In one aspect, the proximity communication link 218 may be used to both validate proximity and to communicate content. In one aspect, a proximity event can be determined using magnetic induction diversity, receive sensitivity, and power level. Once proximity has been determined, the proximity communication link 218 or the wireless communication link 230 may be used. After the communication channel has been established, the mobile computing device and the PSRC device can exchange coupons or any other type of information.

In one embodiment, the mobile computing device 202 can include a proximity location module 216. The proximity location module 216 can be used to assist a consumer in locating a product for which the consumer has received a communicated advertisement. The proximity location module 216 can operate based on a signal strength of the proximity communication link 218 between the SRC device 208 and the PSRC device 214. A relative change in signal strength of the channel, as the mobile computing device 202 is moved, can be displayed on the mobile computing device 202 using graphic display 209. The graphic display 209 can be configured to orient and direct the consumer towards the product associated with the PSRC device 214. In addition, the proximity location module may use information from the media wireless communication link 230 to assist a consumer in locating a product.

In one embodiment, the SRC device 208 operating on the mobile computing device 202 can be configured to receive selected identification information from each PSRC device 214 with which the SRC device 208 communicates at a certain area or location, such as a store. The selected identification information may be an identification code or another type of value used to associate the PSRC device with a product or area. This information may then be shared by the user of the mobile computing device to allow the store to determine various types of information about the user, such as the path that the user traveled through the store and the user's shopping habits. Information shared with the PSRC device from the mobile computing device can be stored on the PSRC device or in a database accessible by the PSRC device. The PSRC device can also share information with the mobile computing device, such as sales, suggested purchases, and the like based on previous purchasing habits. Also, the PSRC device can share information with the mobile computing device, such as a location of a product within the store and/or how to get to that location from the current location.

The identification information can also be used to determine successful marketing displays or promotions made within the store. For instance, the user's purchases at a point of sale terminal at the store can be compared with the PSRC devices that the user passed. This information can be aggregated for a plurality of users shopping at a store and analyzed for data trends, such as a large number of users purchasing a selected product after a display was erected. Alternatively, another type of display may be installed at a store and it can be determined that, while users passed the display, they did not purchase the product.

The collection and sharing of the identification information may be approved of by the user. The user may receive financial incentives to share this information or allow this information to be gathered. For instance, a store, a marketer, or another interested party may offer the user financial incentives to allow a store to receive the identification information from the user's mobile computing device at the point of sale terminal. Financial incentives may include coupons, rebates, a percentage off of total purchases, loyalty points, membership benefits, contest entries, or other types of financial or other incentives that may motivate a user to share such information.

Short Range Communication Channel

In one embodiment, the PSRC device 214 can be configured to operate based on the Near Field Communication (NFC) standard or another type of standard for a close proximity communication device. While examples are given for the NFC standard, the same examples can apply to other types of close proximity communication devices that may be configured to communicate as far as about 20 centimeters, as can be appreciated. Some non-limiting examples of other communication standards include optical and acoustic link communication technologies, and other standards which are described herein.

The NFC standard enables the exchange of data between devices over about a 10 centimeter (around 4 inches) distance. The technology is a simple extension of the ISO/IEC 14443 proximity-card standard (proximity card, RFID) that combines the interface of a smartcard and a reader into a single device. An NFC device can communicate with both existing ISO/IEC 14443 smartcards and readers, as well as with other NFC devices, and is thereby compatible with existing contactless infrastructure already in use for public transportation and payment.

The relatively short communication range of approximately 4 inches for NFC compliant devices is convenient for security purposes since signals transmitted by the NFC device will typically not be received by other NFC compliant devices that are further than 10 cm away. However, the relatively short range significantly reduces the usefulness of NFC for activities such as marketing since it would be tedious for a consumer to traverse a store while travelling within a distance of less than 4 inches from products, or continually and repeatedly touching a device to each product to see if the product is on sale or offering a coupon.

The signals transmitted by NFC compliant devices cannot be received reliably by other NFC compliant devices outside of an approximately 10 cm radius due to inherent limitations placed in the ISO 1443 specification. For example, the specification provides for the use of only a single antenna. Signals that are transmitted using NFC rely on magnetic induction. The magnetic induction signal is optimally received by an antenna having an axis that is parallel with the transmitting antenna. When the transmit antenna and the receive antenna are orthogonal to each other then the signal received has a minimum power. When two devices are relatively close, such as the 10 cm maximum range prescribed in the ISO 1443 specification, then the angular displacement between the two antennas is not as important. Particularly if the distance between the transmitter and receiver is small relative to the diameter of the transmitter antenna coil. However, as the distance between the transmitter and receiver increases compared to the diameter of the transmitter coil, the angular displacement between the receiver and transmitter antennas becomes increasingly important.

One technique for increasing the distance at which a device can receive a signal transmitted by an NFC compliant device, or another type of close proximity communication device, is through the use of multiple antennas that are mutually orthogonal to one another, as previously discussed. Through the use of magnetic induction diversity, wherein an antenna is selected based on its ability to receive or transmit a signal, the use of multiple antennas can significantly improve the ability to detect a signal transmitted by an NFC compliant device at distances outside the normal NFC range by ensuring optimal inductive coupling by maintaining the most efficient angular displacement between the transmit and receive antenna.

The use of magnetic induction diversity enables an NFMI transceiver to be configured that can communicate in multiple modes. For instance, the transceiver can communicate in an NFC compliant mode by operating using a single antenna with no diversity. If it is desired to communicate with an increased distance (i.e., greater than 10 cm), then magnetic induction diversity can be used to increase the distance over which a near field signal can be reliably received. Such a device that is configured to change modes to communicate over a selected distance, or between different devices with different communication protocols, is referred to as a Multi-Mode Magnetic Induction Communication (MMMIC) device. An example of a MMMIC device implementing magnetic induction diversity is described below with reference to FIG. 3.

Figure 3:
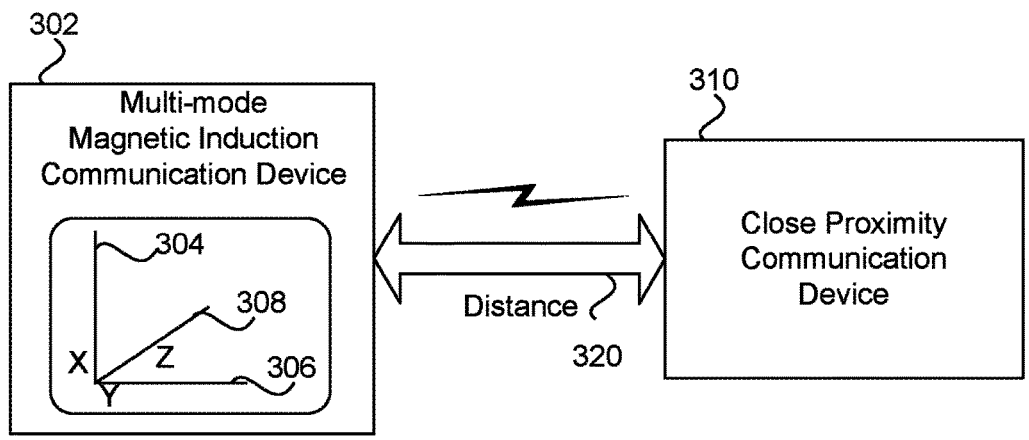
FIG. 3 illustrates a block diagram of an example illustration of a Multi-Mode Magnetic Induction Communication (MMMIC) device having three mutually orthogonal antennas in accordance with an embodiment of the present invention.

FIG. 3 illustrates a block diagram of an example illustration of a MMMIC device having a plurality of antennas in accordance with an embodiment of the present invention. While the MMMIC device illustrated in FIG. 3 and described herein may be described in the context of the marketing system described herein, it is equally applicable to other implementations of the wireless communication of proximity based content.

Referring to FIG. 3, a MMMIC device 302 is shown having three mutually orthogonal antennas 304-308 that are located in the X, Y, and Z axes respectively. The MMMIC device 302 is separated from a close proximity communication device 310, such as an NFC compliant device, by a distance 320. When the distance 320 is greater than 10 centimeters (cm) then other NFC compliant devices typically cannot detect the signal reliably.

In accordance with one example embodiment of the present invention, magnetic induction diversity can be used to increase the distance 320 over which a signal from a close proximity communication device can be received. A relatively low power signal transmitted by a close proximity communication device 310 can be detected through the use of multiple orthogonal antennas 304-308. In one embodiment, the signal detected by each of the orthogonal antennas can be summed to provide a maximum strength detected signal, thereby maximizing the distance over which the signal can be detected. Alternatively, a selection metric of the received signal can be measured at each antenna.

For instance, the PSRC device 214 disposed in the proximity computing device 210 that is located adjacent to the product location, as illustrated in the example provided in FIG. 2, may be an NFC compliant transceiver that transmits a signal from a single antenna. The SRC device 208 at the consumer's mobile computing device 202 may include multiple orthogonal antennas and operate as an MMMIC device 302. A selection metric of the received signal can be measured at each antenna of the MMMIC device 302 to select an optimal antenna on which to receive a signal from the close proximity communication device 310. The same antenna can, in some examples, be selected to both receive and transmit the signal(s). Some examples of selection metrics that may be used to select an antenna to receive the signal are listed below:

Receive Signal Strength Indicator (RSSI), wherein the antenna having the greatest RSSI is selected to receive the signal;

Decoder output Bit Error Rate (BER), wherein the antenna with the received signal having the lowest BER at the decoder is selected to receive the signal;

Round-robin strategy (i.e., try each possible selection in turn and choose the best); and Shannon capacity, wherein the antenna providing a received signal with the highest Shannon capacity or highest instantaneous link capacity is selected.

Additional techniques can also be used as a selection metric, such as Eigenvalue selection of an antenna and selection based on the detection of cyclic redundancy codes used with forward error correction. Moreover, the signals of multiple antennas can be selected and summed. For example, the best two antennas can be selected and summed based on the selection metrics. Any metric capable of prioritizing the antennas based on the received and/or transmitted signals between two magnetic induction communication devices is considered to be within the scope of the present invention. It should be understood that both the PSRC device 214 and the SRC device 208 at the consumer's mobile computing device 202 can be configured as transceivers capable of full duplex communication (i.e., transmission and reception).

Similarly, a metric, such as the metrics previously listed, may be used to select a transmit antenna. Typically, the antenna with a greatest selection metric (i.e. receiving the most data) can also be used to transmit the most efficiently. Any metric capable of prioritizing the antennas based on the received and/or transmitted signals between at least two magnetic induction communication devices is considered to be within the scope of the present invention.

Returning to FIG. 3, the antenna(s) 304-308 of the MMMIC device 302 with the desired selection metric can be selected as the receive antenna. Antenna selection may be performed at a regular rate, such as several times per second. Antenna selection may be performed as often as every data packet that is received at the MMMIC device 302. As each packet is received, the antenna(s) having the desired metric can be selected. Thus, as a mobile MMMIC device 302 is moved and rotated, the antenna(s) that are most closely parallel to the transmit antenna in the close proximity communication device 310 can be used to receive the signal transmitted from the close proximity communication device 310. This allows the MMMIC device 302 to be moved and rotated with substantially any type of angular displacement relative to the close proximity communication device 310 without significantly reducing the power of the received signal, thereby enabling the MMMIC device 302 to receive the transmitted signal from the close proximity communication device 310 at greater distances than a standard device, such as an NFC compliant device having a single antenna would allow, while requiring no increase in the transmit power for an NFC compliant device. In some examples, the NFC compliant device can be located in the mobile computing device and the PSRC device can be a MMMIC device. Likewise, in some examples, the NFC compliant device can be the PSRC and the SRC device in the mobile computing device can be a MMMIC device.

In some examples, the mobile computing device can provide user-enabled options, where NFC, Bluetooth, and other communication modes can be selectively enabled, disabled, etc. For example, one option may include "all off" where all communication modes are disabled. Another option may be "NFC only". Another option may be an "NFC plus sniff" option wherein NFC is enabled and the MMMIC device checks for a signal occurring at a distance of greater than 10 cm at predetermined periodic intervals (e.g., 1 second, 5 seconds, etc.). Another option may be "all on" to enable all communication modes to be active. In some examples, certain communication modes may be enabled and provide auto-connect capabilities based on preferences, or may prompt a user to select whether to connect. In a more detailed example, a user can select, for instance, to enable NFMI (i.e. extended range mode) and connect to a wireless network when the user has entered a specific building.

The operational mode of the mobile computing device can also be location dependent. For instance, a user can, when entering a store or a specific location, set the mobile computing device to use the MMMIC capability to communicate over an extended distance when the mobile computing device is at that location. The location may be determined based on an identification value that is used to identify the location, or via a location determination means such as via a global positioning system detector or another type of radio frequency triangulation scheme. The mobile communication device may prompt to place the device in an extended communication range. Alternatively, the mobile communication device may automatically enter an extended communication range mode at a selected location when the device has been set to be in this mode is at the selected location.

In addition, the MMMIC device 302 may include features that further increase the ability of the MMMIC device 302 to receive the relatively low power signal transmitted by the close proximity communication device 310. For example, one or more of the plurality of antennas 304-308 in the MMMIC device 302 may be larger than the antenna design disclosed in the ISO 14443 specification for an NFC compliant device. The ISO 14443 specification requires that a compliant antenna consist of a Proximity Integrated Circuit Card (PICC) antenna having dimensions of less than 81 millimeters (mm) by 49 mm.

The MMMIC device 302 can include larger antennas, or antennas having non planar shapes that are designed to have an increased gain relative to the PICC antenna disclosed in the ISO 14443 specification. The increased gain of the antenna(s) in the MMMIC device 302 enables receive signals to be detected that have a lower power than can be received with an ISO 14443 compliant PICC antenna.

Additional components comprising the RF front end of the MMMIC device 302 may also be selected to be more sensitive than those used in an NFC compliant device. For example, a Low Noise Amplifier (LNA) in the MMMIC device 302 may have a lower noise figure than the LNA used in an NFC compliant device.

In one embodiment, the MMMIC device 302 can be a dual mode device configured with the ability to change communication protocols to communicate with multiple inductively coupled communication devices having different communication protocols. For instance, the MMMIC device 302 can be configured to communicate with the NFMI device 310 using Gaussian Minimum Shift Keying (GMSK) at a carrier wave frequency of F1. Other types of modulation may be used as well.

NFC compliant devices are typically configured to use Amplitude Shift Keying (ASK) modulation on a carrier wave frequency of F2, which is typically 13.56 Megahertz (MHz). The frequency F1 may be the same as, or different from F2 depending on the type of application for which the NFMI device 310 is applied.

An example a MMMIC device in communication with NFC compliant and non-NFC compliant devices is described below with reference to FIG. 4. While an NFC compliant device is described, the MMMIC device can be configured to communicate with other types of close proximity communication devices, as can be appreciated.

Figure 4:
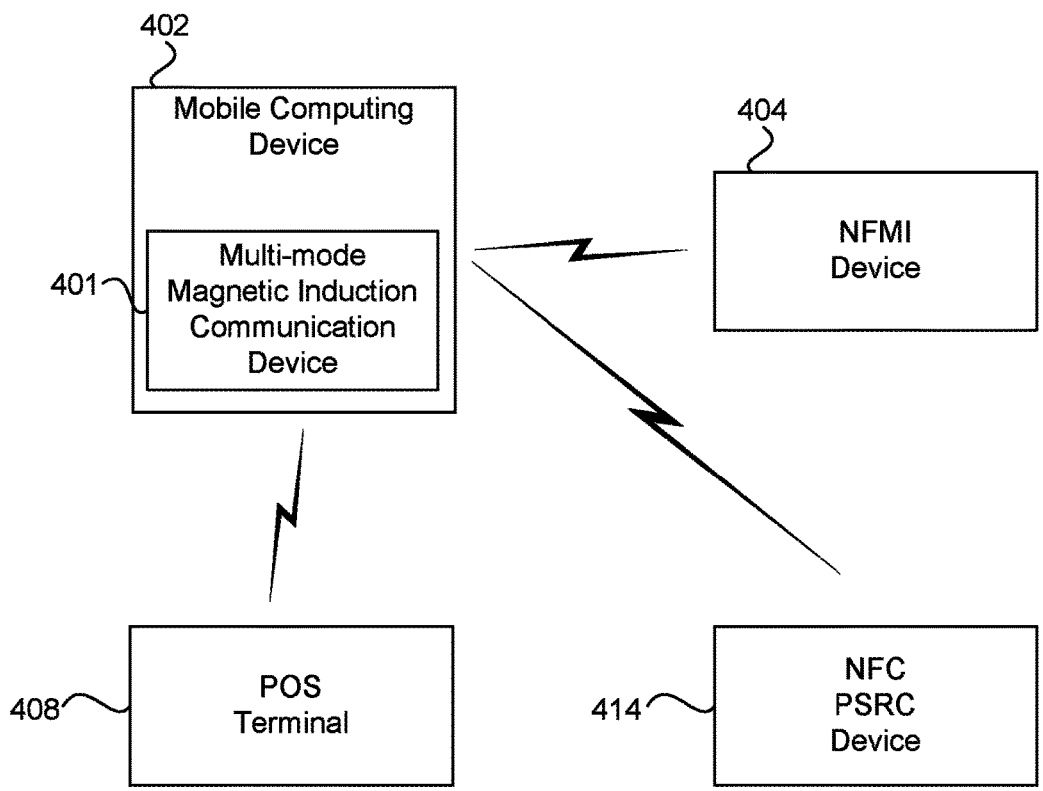
FIG. 4 illustrates a block diagram of a MMMIC device incorporated in a mobile computing device and in communication with Near Field Communication (NFC) compliant and non-NFC compliant devices in accordance with an embodiment of the present invention.

FIG. 4 illustrates a block diagram of a MMMIC device incorporated in a mobile computing device and in communication with NFC compliant and non-NFC compliant devices in accordance with an embodiment of the present invention. While the MMMIC device illustrated in FIG. 4 and described herein may be described in the context of the marketing system described herein, it is equally applicable equally applicable to other implementations of the wireless communication of proximity based content.

Regarding FIG. 4, the MMMIC device 401 may be incorporated in a cell phone or other type of mobile computing device 402. The MMMIC device 401 incorporated in the mobile computing device 402 can be used to communicate with other NFMI devices 404. For example, other NFMI devices 404 may pass audio to and from a wireless headset, exchange data to and from a computer or at a toll both, or work as a passive keyless entry for an automobile or electronic security entrance lock. The MMMIC device 401 contained in the mobile computing device 402 can also be configured to communicate with NFC compliant devices, such as an NFC compliant POS terminal 408 or an NFC compliant PSRC device 414.

MMMIC device 401 (and MMMIC device 302 of FIG. 3) may be capable of receiving a signal that was transmitted within a distance of the receiver that is approximately equal to a wavelength of the carrier signal divided by 2pi ($\lambda/2\pi$). When the carrier signal frequency of the MMMIC device 401 (and MMMIC device 302 of FIG. 3) is 13.56 MHz, then the maximum communication distance is approximately 3.5 meters. The MMMIC device 401 (and MMMIC device 302 of FIG. 3) can be configured to communicate with NFC compliant device 404 or other types of devices configured to communicate using NFMI within a desired distance, such as 6 feet. As previously discussed, the use of magnetic induction diversity enables the size of the proximity boundary to be set within a relatively tight tolerance.

For instance, returning to FIG. 2, when a user carrying the mobile computing device 202 passes within a distance 220 of approximately six feet from a desired product (and PSRC 214), the user can be notified through his or her mobile computing device 202 (or external device 224) that the product is within approximately +/−3 feet of the user. Additional information, such as a picture of the product and/or a coupon, may be displayed on the graphic display 209 of the user's mobile computing device 202 to incentivize the user to find and purchase the product. The user can then locate the product on the shelf and determine whether or not to purchase the product.

Returning back to FIG. 4, the user's mobile computing device 402 containing the MMMIC device 401 can also be configured to detect the position of the PSRC device 414, thereby assisting the user to locate the desired product on the store shelves. The use of an NFMI device to detect the position of another NFMI device on store shelves is more fully disclosed in U.S. Pat. No. 7,532,901, which is herein incorporated by reference.

The user can continue through the store to purchase other desired products. When the user approaches the checkout stand, the user's mobile computing device 402 containing MMMIC device 401 can be configured to detect an NFC compliant POS terminal at the checkout stand. The NFC compliant POS terminal 408 is configured to transmit a signal at 13.56 MHz. As previously discussed, this signal is intended for other NFC compliant devices and is not typically detectable by NFC compliant devices at a distance of greater than 10 centimeters (cm).

However, the MMMIC device 401 may be configured to detect the signal from the NFC POS terminal 408, which is an NFC compliant device, at a distance of over 10 cm or up to about 6 feet. When the MMMIC device 401 uses magnetic induction diversity and/or other methods previously described such as power, sensitivity, antenna size, and antenna position to detect an NFC signal at a distance of greater than 10 cm, it can be considered to be in an extended NFC mode.

When the user's mobile computing device 402 containing an MMMIC device 401 detects a signal from an NFC compliant POS device 408, the mobile computing device 402 can be configured to query the user to determine if the user wants to switch the MMMIC device 401 into an NFC compliant mode. By switching the MMMIC device 401 into an NFC compliant mode, the security level can be increased by reducing the size of the communication "boundary" in which a transmitted near field signal is detectable. Alternatively, the mobile computing device may be configured to automatically change to an NFC compliant device mode when the NFC device is identified as a POS terminal or other NFC device. The identification of the NFC device as a POS terminal can occur automatically by transmitting the information from the NFC POS terminal to the MMMIC device 401.

When the MMMIC device 401 is in an NFC compliant state, the MMMIC device can be configured to transmit and receive signals based on the ISO 14443 specification, thereby reducing the signal detection boundary to a radius of approximately 10 cm. The user can then transmit information with the MMMIC device 401, such as credit card information or other types of financial information that enables the retailer to obtain electronic funding for the user's purchase. The information may be information such as credit card information to conduct an electronic transaction using his or her mobile computing device.

In one embodiment, the MMMIC device 401 can communicate simultaneously in both NFC compliant mode and in a non-NFC compliant mode, such as to other NFMI devices. For instance, the MMMIC device 401 in the mobile computing device 402 may be coupled to another NFMI device 404 while also conducting NFC compliant communication with the NFC compliant POS terminal 408. For example, the mobile computing device 402 can communicate in an NFC compliant mode with the POS terminal 408 to transmit secure information such as a credit card number or other banking information, while simultaneously communicating with an NFMI radio transceiver 404 such as a headset used for voice communication. In another embodiment, the mobile computing device can communicate in NFC compliant mode with the POS terminal 408 while simultaneously communicating in an extended range mode with a PSRC device 414.

In one embodiment, the NFC compliant POS terminal can communicate one or more electronic promotions such as coupons, loyalty points, survey forms, rebates, etc. to the MMMIC device 401 in the mobile computing device when the sales transaction occurs. The promotions communicated to the mobile computing device can be selected based on the products purchased at the POS terminal. The promotions can be stored in digital storage at the mobile computing device. The promotion information can be communicated to the POS terminal. In one embodiment, promotions that are already stored on the mobile computing device can be communicated to the POS terminal via NFC or extended NFC even though no payment transaction takes place between the mobile computing device and the POS terminal. This allows the user to pay by cash or credit card but remotely send coupons from the mobile computing device with no action from the user.

When a user wishes to purchase a product at an NFC compliant POS terminal 408, it may take some time to transfer large amounts of information, such as information related to coupons or other types of discounts or advertising material and the like via NFC. The data rate in an NFC compliant mode can be relatively low, thereby requiring the user to keep the mobile computing device in close proximity with the POS terminal for an extended period of time. The user may not wish to hold the mobile computing device near the POS terminal for a period that is sufficiently long for additional information, such as coupon information to be transferred. Furthermore, the coupon information may typically be less sensitive than payment information. Therefore, in one example, payment information, such as bank routing information, bank account number, and so forth can be exchanged at the beginning of a transaction using NFC, and other lower priority or lower security information can be sent toward the end of a transaction to or from the mobile computing device using another means of communication, such as extended range NFMI, or other multimedia communications technologies using the media wireless communication link 230 (FIG. 2), which preferably can allow the user to move the mobile computing device away from the POS terminal while transmitting the information. Thus, the MMMIC device 401 can be more convenient for transmitting both sensitive and non-sensitive data relative to an NFC only communication device.

When the MMMIC device 401 is placed in an NFC compliant mode, it can be determined which antenna 304-308 (FIG. 3) to use in the MMMIC device to conduct the NFC compliant communication. In one embodiment, a non-optimal antenna can be used, thereby freeing up the optimal antenna to conduct communication with a non-NFC compliant device, such as such as a headphone or ear piece configured to communicate using NFMI.

For instance, the user may be using the MMMIC device 401 to transmit the voice signal of a phone call from the user's mobile computing device to an earpiece worn by the user (not shown) while the user is shopping. In one embodiment, the antenna with the best selection metric can always be used to receive and transmit the voice communication to the ear piece. Alternatively, two or more mutually orthogonal antennas may be used to receive a signal and the signal from each antenna can be summed. One of the remaining antennas in the MMMIC device 401 can be used to transmit and receive signals to the NFC compliant POS device 408 to conduct the financial transaction.

In one embodiment, the plurality of antennas in the MMMIC device 401 can be ranked based on the selection metric measured for an antenna. The ranking can be conducted based on a communication with a transceiver in an extended NFC mode. Since the need to guarantee proper alignment and/or polarization between two NFC compliant devices is significantly reduced, due to the close proximity of the devices when communication occurs (typically less than 10 cm), then the antenna with the lowest rank on the MMMIC device 401 in extended NFC mode may be assigned to communicate with the NFC compliant device when the MMMIC device 401 is placed in an NFC compliant mode with a selected NFC compliant device. Alternatively, any antenna other than the top ranked antenna (which may be reserved for communication with NFMI devices or over an extended distance with other NFC compliant devices) may be used to communicate with the NFC complaint device.

In another embodiment, the user may determine that the additional privacy provided by the reduced communication distance is not needed. In this case, the user may be able to conduct the transaction within a distance of about $\lambda/2\pi$ (3.5 meters at a frequency of 13.56 MHz) from the NFC compliant device 308, as previously discussed. In addition, the data transmitted and received by the MMMIC device 401 can be scrambled and/or encrypted, thereby making it difficult to intercept.

Returning to FIG. 4, in one embodiment, the user may use his or her mobile computing device 402 to establish predefined limits, such as financial limits, in which the MMMIC enabled mobile computing device can be used to conduct a financial transaction at the greater distance (i.e., when it is not in NFC compliant mode). The user can control when information is sent via an extended range. In one embodiment, the user can set up the mobile computing devices so that financial transactions that involve communicating sensitive data, such as account information, can only be conducted at a short distance, such as when using an NFC compliant communication from the mobile computing device. The mobile computing device can also be configured to allow the communication of information that does not include sensitive information, such as marketing information, coupon information, rebate information, and so forth, to be communicated at a longer range, such as greater than the NFC range of 10 cm.

In one embodiment the user may determine that for purchases for products costing less than $20.00, the financial transaction between the MMMIC enabled mobile computing device 402 and the NFC compliant POS terminal 408 can be conducted at a distance of up to 3 meters from the NFC compliant terminal 408. The user will typically enter information, such as a pass code, at the POS terminal to complete the purchase. However, this may not be necessary in all situations. For inexpensive purchases, the user may simply pass within the predefined distance of the NFC compliant POS terminal and receive a notification, such as a chime or graphical indication on a display, that the purchase was completed.

For instance, at a library the user can pass the checkout stand, hear a chime, and know that all of the books the user has selected are checked out to the user. The NFC compliant POS terminal 408 can display information related to the purchase, rental, lease, or other type of transaction. For example, the POS terminal can display information such as what was purchased and the amount, and provide a receipt if desired.

In one embodiment, preferences selected by the consumer can be overridden based on a distance of the mobile computing device to the PSRC device. For instance, with reference to FIG. 2, when the SRC device 208 in the mobile computing device 202 is a MMMIC device that is operating in an NFC mode and is within a distance of 10 cm from the PSRC device 214, then the rules set in the proximity based communication filter module 212 may be automatically overridden to enable marketing information to be received from the PSRC device (or the proximity media communication device 226).

When the MMMIC device 401 is configured to operate at two separate frequencies, such as 13.92 MHz with NFMI devices and 13.56 MHz with NFC compliant devices, a separate RF front end may be used to detect and demodulate the NFMI signal and the NFC compliant signal. The NFMI device can be configured to route received signals to the appropriate front end through detection, filtering, and switching. Each front end can include the appropriate matching filters, band pass filters, low noise amplifier, and downconverter for the selected frequency. The MMMIC device can be configured to share the same antenna and communicate using multiple protocols simultaneously. When the same operating frequency is used by both types of devices then the NFMI device may use a single front end to receive both NFC compliant signals and non-compliant signals from other NFMI devices. A different demodulator may be used depending on the type of modulation scheme used by each device.

An example of a method for proximity based communication is described below with reference to FIG. 5 as a specific example of a method for the wireless communication of proximity based content is described.

Figure 5:
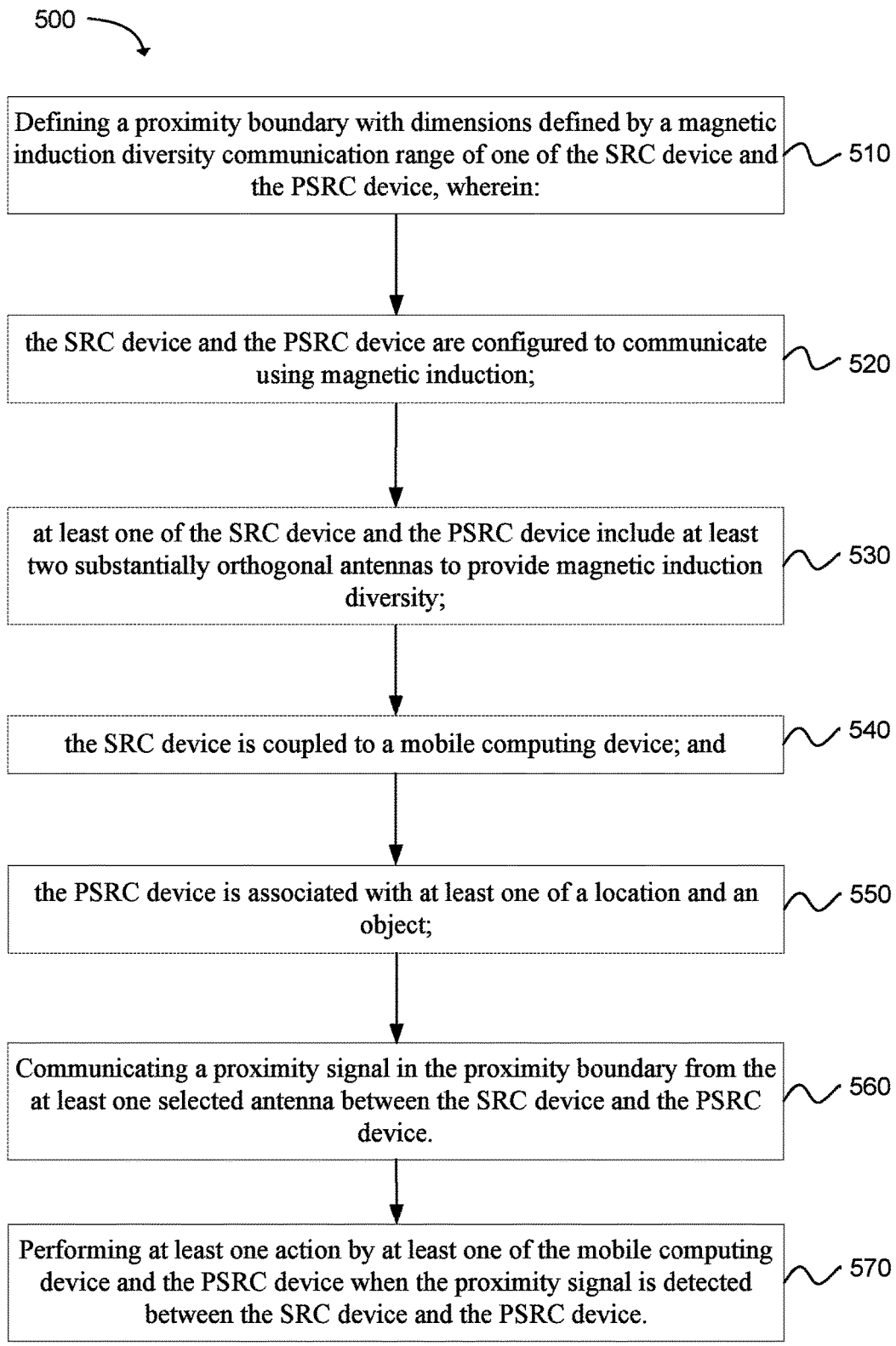
FIG. 5 depicts a flow chart of a method for wireless communication of proximity based marketing in accordance with an embodiment of the present invention.

Referring to FIG. 5, a method 500 for the wireless communication of proximity based content is shown. The method includes the operation 510 of defining a proximity boundary with dimensions defined by a magnetic induction diversity communication range of one of a Short Range Communication (SRC) device and a Proximity Short Range Communication (PSRC) device.

In operation 520, the SRC device and the PSRC device are each configured to communicate using magnetic induction. In operation 530, at least one of the SRC device and the PSRC device include at least two substantially orthogonal antennas to provide magnetic induction diversity. In operation 540 the SRC device is coupled to a mobile computing device. In operation 550, the PSRC device is associated with at least one of a location and an object.

In operation 560, the method further comprises communicating a proximity signal in the proximity boundary from the at least one selected antenna between the SRC device and the PSRC device. In operation 570, at least one action is performed by at least one of the PSRC device and the mobile computing device when the proximity signal is detected between the SRC device and the PSRC device.

In one embodiment, the SRC device and the PSRC device can have substantially similar communication ranges and receive sensitivities to enable them to communicate with each other at any location within the proximity boundary. Alternatively, one of the devices can have a greater communication range and/or receive sensitivity. For instance, the SRC device may have a plurality of orthogonal antennas while the PSRC device may be configured to be NFC compliant and may only have a single antenna. This would enable the SRC device to receive signals at a greater distance than the NFC device. However, the SRC device may also have a greater communication range, enabling it to transmit at a higher power to allow the PSRC device to receive signals communicated when the SRC device is located at distances greater than 10 cm, the designed outer range of an NFC compliant device. Other design variations are also possible based on different configurations, as can be appreciated. The communication ranges and receive sensitivities can define the maximum dimension of the proximity boundary.

In one embodiment, the selected action performed at the mobile computing device involves storing information related to an advertisement communication at the mobile computing device when the advertisement communication is related to the desired product having the set rules to receive information regarding the product.

In another embodiment, the selected action performed at the mobile computing device involves alerting the customer that the product is within a proximity of the customer through an alert output by the mobile computing device. The alert may be an audio alert, a vibration alert, a visual alert, and the like. For instance, an image of the product or a coupon for the product may be displayed. An advertisement communication, such as a video or other type of multimedia presentation may also be displayed that relates to the product. Alternatively, no alert may be output to the user by the mobile computing device.

The advertisement communication may be communicated to the mobile computing device through a communication means such as, for example, email, texting, instant messaging, using a wired transmission, or a wireless transmission. This example is not intended to be limiting. Other types of communication means can be used as well, as can be appreciated.

The SRC device associated with a selected product can be NFC compliant, as previously discussed. Alternatively, the PSRC device may communicate using a non-NFC compliant form of communication. For instance, a power of the signal or a size of the antenna may be outside allowed specifications in the NFC standards.

While various embodiments described herein refer to communications between a mobile computing device and a PSRC device, the communications may be between any type of suitable device. For example, the communications may be between devices selected from the following types of devices: phone, personal computer, car, appliance, payment device, access control device, and so forth. The devices can be a same or different type. In one embodiment, a communication between a phone and a personal computer (PC) may be accomplished via a proximity communication link 218 (FIG. 2). Proximity information can be stored on the phone, or may be accessible by the phone or the pc (e.g., the information may be stored in the cloud). The proximity information can be used to define a user profile for applications outside of the proximity area. For example, a user may approach a computing device such as, a tablet computer, a portable computer, or a desktop computer with the mobile computing device 200. Using the proximity information available from the mobile computing device, advertisements on the computing device can be tailored to the user, even if the user has not previously used the particular computing device. Similarly, a car may have various settings, such as favorite radio stations, seat positions, steering wheel height, favorite global positioning satellite system (GPS) points of interest, and the like which can be retrieved based on an identification of the user via a proximity communication link 218 from a mobile computing device 200 and automatically set according to the user preferences.

It should be understood that many of the functional units described in this specification have been labeled as modules, in order to more particularly emphasize their implementation independence. For example, a module may be implemented as a hardware circuit comprising custom Very-Large-Scale Integration (VLSI) circuits or gate arrays, a custom Application-Specific Integrated Circuit (ASIC), off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a Short Range Communication (SRC) device configured for the wireless communication of proximity based content, the apparatus configured to:
    define a proximity boundary with dimensions defined by a selected magnetic induction diversity communication range of the SRC device, wherein
        the SRC device is configured to communicate using magnetic induction;
        the SRC device includes at least two substantially orthogonal antennas to provide magnetic induction diversity; and
        the SRC device is coupled to a mobile computing device;
    communicate a proximity signal in the proximity boundary from the at least one selected antenna between the SRC device and a PSRC device using the magnetic induction diversity to substantially reduce a variability of the dimensions of the proximity boundary defined by the selected magnetic induction diversity communication range;
    perform at least one action by at least one of the mobile computing device and the PSRC device when the proximity signal is detected between the SRC device and the PSRC device; and
    set at least one rule for a proximity based communication filter module, which is associated with the mobile computing device, regarding the wireless communication of proximity based content, the at least one rule identifying the at least one action performed by the mobile computing device when the proximity signal is detected between the SRC device and the PSRC device.

2. The apparatus of claim 1,
    wherein the at least one action is performed by the mobile computing device based on the at least one rule when the proximity signal is detected between the SRC device and the PSRC device.

3. The apparatus of claim 1, further configured to:
    set at least one rule for a proximity based communication filter module, which is associated with a proximity computing device that includes the PSRC device and is associated with at least one of a location and an object, regarding the wireless communication of proximity based content, the at least one rule identifying at least one action performed by the proximity computing device when the proximity signal is detected between the SRC device and the PSRC device,
    wherein the at least one action is performed by the proximity computing device based on the at least one rule when the proximity signal is detected between the SRC device and the PSRC device.

4. The apparatus of claim 3, further configured to store the at least one rule for the proximity based communication filter module on the mobile computing device to increase a user's privacy.

5. The apparatus of claim 1, wherein the communicating of the proximity signal in the proximity boundary between the SRC device and the PSRC device comprises one of transmitting the proximity signal from the PSRC device to the SRC device and transmitting the proximity signal from the SRC device to the PSRC device.

6. The apparatus of claim 1, wherein the performing of the at least one action by one of the mobile computing device and the PSRC device comprises communicating content to the mobile computing device related to a location or object associated with the PSRC device.

7. The apparatus of claim 6, wherein the content related to the location or object associated with the PSRC device is communicated to the mobile computing device using a media communication device that does not communicate using near field magnetic induction.

8. The apparatus of claim 6, wherein the performing of the at least one action by one of the mobile computing device and the PSRC device further comprises storing the received content in a memory of the mobile computing device.

9. The apparatus of claim 1, wherein the performing of the at least one action by one of the mobile computing device and the PSRC device comprises communicating content to the PSRC device from the mobile computing device.

10. The apparatus of claim 9, wherein the content is communicated from the mobile computing device to the PSRC device via the SRC device.

11. The apparatus of claim 9, wherein the content is communicated from the mobile computing device to the PSRC device via a media communication device that does not communicate using near field magnetic induction.

12. The apparatus of claim 1, wherein the PSRC device is a Near Field Communication (NFC) compliant device, and:
    wherein the SRC device is a Multi-Mode Magnetic Induction Communication (MMMIC) device having magnetic induction diversity.

13. The apparatus of claim 12, wherein the MMMIC device includes a Near Field Communication (NFC) compliant mode to transmit and receive with an NFC compliant device within a distance of less than approximately 10 centimeters.

14. The apparatus of claim 12, wherein the MMMIC device includes a close proximity communication mode to transmit and receive with a close proximity communication device within a distance of less than approximately 30 centimeters.

15. The apparatus of claim 12, wherein the MMMIC device is configured to communicate simultaneously with at least two NFC compliant devices.

16. The apparatus of claim 12, further comprising detecting the proximity signal at the SRC device that is transmitted by the PSRC device at a distance of greater than about 10 centimeters (cm).

17. The apparatus of claim 3, further comprising determining that the at least one of the location and the object is located within a range corresponding to dimensions of the proximity boundary.

18. The apparatus of claim 1, wherein a range of the proximity signal is a distance that is less than λ/2pi meters between the SRC device and the PSRC device, where λ is a wavelength of the proximity signal in meters.

19. An apparatus of a proximity short range communication (PSRC) device configured for the wireless communication of proximity based content, the apparatus configured to:
define a proximity boundary with dimensions defined by a selected magnetic induction diversity communication range of the PSRC device, wherein
the PSRC device is configured to communicate using magnetic induction;
the PSRC device includes at least two substantially orthogonal antennas to provide magnetic induction diversity, wherein the magnetic induction diversity is used to substantially reduce a variability of an edge of the defined proximity boundary; and
the PSRC device is associated with at least one of a location and an object;
communicate a proximity signal in the proximity boundary from the at least one selected antenna between a SRC device and the PSRC device, wherein the SRC device is coupled to a mobile computing device;
perform at least one action by at least one of the mobile computing device and the PSRC device when the proximity signal is detected between the SRC device and the PSRC device; and
set at least one rule for a proximity based communication filter module, which is associated with a proximity computing device that includes the PSRC device, regarding the wireless communication of proximity based content, the at least one rule identifying at least one action performed by the proximity computing device when the proximity signal is detected between the SRC device and the PSRC device.

20. The apparatus of claim 19,
wherein the at least one action is performed by the proximity computing device based on the at least one rule when the proximity signal is detected between the SRC device and the PSRC device.

21. The apparatus of claim 19, wherein the communicating of the proximity signal in the proximity boundary between the SRC device and the PSRC device comprises one of transmitting the proximity signal from the PSRC device to the SRC device and transmitting the proximity signal from the SRC device to the PSRC device.

22. The apparatus of claim 19, wherein the performing of the at least one action by one of the mobile computing device and the PSRC device comprises communicating content to the mobile computing device related to a location or object associated with the PSRC device.

23. The apparatus of claim 22, wherein the content related to the location or object associated with the PSRC device is communicated from the PSRC device to the mobile computing device via the SRC device.

24. The apparatus of claim 22, wherein the content related to the location or object associated with the PSRC device is communicated to the mobile computing device using a media communication device that does not communicate using near field magnetic induction.

25. The apparatus of claim 22, wherein the performing of the at least one action by one of the mobile computing device and the PSRC device further comprises storing the received content in a memory of the mobile computing device.

26. The apparatus of claim 19, wherein the PSRC device is a Near Field Communication (NFC) compliant device, and wherein the SRC device is a Multi-Mode Magnetic Induction Communication (MMMIC) device having magnetic induction diversity.

27. At least one non-transitory machine readable storage medium having instructions embodied thereon for communicating proximity based content, the instructions when executed on a mobile computing device perform the following:
define a proximity boundary with dimensions defined by a selected magnetic induction diversity communication range of an SRC device, wherein
the SRC device is configured to communicate using magnetic induction;
the SRC device includes at least two substantially orthogonal antennas to provide magnetic induction diversity; and
the SRC device is coupled to the mobile computing device;
communicate a proximity signal in the proximity boundary from the at least one selected antenna between the SRC device and a PSRC device using the magnetic induction diversity to substantially reduce a variability of the dimensions of the proximity boundary defined by the selected magnetic induction diversity communication range;
perform at least one action by at least one of the mobile computing device and the PSRC device when the proximity signal is detected between the SRC device and the PSRC device; and
set at least one rule for a proximity based communication filter module, which is associated with the mobile computing device, regarding the wireless communication of proximity based content, the at least one rule identifying the at least one action performed by the mobile computing device when the proximity signal is detected between the SRC device and the PSRC device.

28. The at least one non-transitory machine readable storage medium of claim 27,
wherein the at least one action is performed by the mobile computing device based on the at least one rule when the proximity signal is detected between the SRC device and the PSRC device.

29. At least one non-transitory machine readable storage medium having instructions embodied thereon for communicating proximity based content, the instructions when executed by a PSRC device perform the following:
define a proximity boundary with dimensions defined by a selected magnetic induction diversity communication range of the PSRC device, wherein
the PSRC device is configured to communicate using magnetic induction;
the PSRC device includes at least two substantially orthogonal antennas to provide magnetic induction diversity, wherein the magnetic induction diversity is used to substantially reduce a variability of an edge of the defined proximity boundary; and
the PSRC device is associated with at least one of a location and an object;
communicate a proximity signal in the proximity boundary from the at least one selected antenna between a SRC device and the PSRC device, wherein the SRC device is coupled to a mobile computing device;

perform at least one action by at least one of the mobile computing device and the PSRC device when the proximity signal is detected between the SRC device and the PSRC device; and set at least one rule for a proximity based communication filter module, which is associated with a proximity computing device that includes the PSRC device, regarding the wireless communication of proximity based content, the at least one rule identifying at least one action performed by the proximity computing device when the proximity signal is detected between the SRC device and the PSRC device.

30. The at least one non-transitory machine readable storage medium of claim 29, wherein the at least one action is performed by the proximity computing device based on the at least one rule when the proximity signal is detected between the SRC device and the PSRC device.

* * * * *